US009059653B2

(12) United States Patent
Shimada et al.

(10) Patent No.: US 9,059,653 B2
(45) Date of Patent: Jun. 16, 2015

(54) ROTATING ELECTRICAL MACHINE CONTROL DEVICE

(71) Applicant: AISIN AW CO., LTD, Anjo-shi, Aichi-ken (JP)

(72) Inventors: Arinori Shimada, Nishio (JP); Subrata Saha, Anjo (JP)

(73) Assignee: AISIN AW CO., LTD., Anjo (JP)

(*) Notice: Subject to any disclaimer, the term of this patent is extended or adjusted under 35 U.S.C. 154(b) by 0 days.

(21) Appl. No.: 14/233,315

(22) PCT Filed: Oct. 17, 2012

(86) PCT No.: PCT/JP2012/076843

§ 371 (c)(1),
(2) Date: Jan. 16, 2014

(87) PCT Pub. No.: WO2013/058281

PCT Pub. Date: Apr. 25, 2013

(65) Prior Publication Data

US 2014/0145660 A1 May 29, 2014

(30) Foreign Application Priority Data

Oct. 21, 2011 (JP) ................................. 2011-232067

(51) Int. Cl.
*H02P 6/18* (2006.01)
*H02P 21/00* (2006.01)
*H02P 21/14* (2006.01)

(52) U.S. Cl.
CPC ............ *H02P 6/183* (2013.01); *H02P 21/0039* (2013.01); *H02P 21/146* (2013.01)

(58) Field of Classification Search
CPC ... H02P 21/0039; H02P 21/146; H02P 21/14; H02P 27/08; H02P 6/183; H02P 2203/11; H02P 2207/05; H02P 21/0003; H02P 21/0032; H02P 21/0042; H02P 21/0053; H02P 21/05; H02P 2203/05; H02P 2205/05
USPC ............. 318/400.02, 400.11, 400.23, 400.32, 318/400.33, 432
See application file for complete search history.

(56) References Cited

U.S. PATENT DOCUMENTS 6,583,593 B2 * 6/2003 Iijima et al. .............. 318/400.32
8,084,976 B2 * 12/2011 Hashimoto .................. 318/432
(Continued)

FOREIGN PATENT DOCUMENTS

JP A-2004-112938 4/2004
JP A-2010-154597 7/2010
JP A-2010-166638 7/2010
JP A-2012-120297 6/2012

OTHER PUBLICATIONS

Yamada et al., "Speed Control Method of Position Sensorless Salient—Pole PM Motor for Wide Speed Range Using High Frequency Current Injection," *Heisei 9 National Convention Record I.E.E. Japan*, Mar. 10, 1997, pp. 4-356 to 4-357.
(Continued)

*Primary Examiner* — Paul Ip
(74) *Attorney, Agent, or Firm* — Oliff PLC

(57) ABSTRACT

A rotating electrical machine control device that applies a high frequency current to a rotating electrical machine including a rotor having saliency, estimates a magnetic pole direction of the rotor on the basis of a high frequency component contained in a voltage command as a response component to the high frequency current, and controls the rotating electrical machine. A high frequency superimposing section sets an estimated d-q axis rotating coordinate system, and a magnetic pole direction adjusting section sets a high frequency coordinate system having a phase difference of the high frequency current command with respect to the estimated d-q axis rotating coordinate system. A steady estimation error correcting section calculates a magnetic flux interference estimation error as an error of the estimated value of the magnetic pole direction which is caused by the d-q axis magnetic flux interference.

3 Claims, 9 Drawing Sheets

(56) References Cited

U.S. PATENT DOCUMENTS

| | | | | |
|---|---|---|---|---|
| 8,084,977 | B2 * | 12/2011 | Hashimoto | 318/432 |
| 8,159,163 | B2 * | 4/2012 | Akiyama | 318/400.11 |
| 8,330,402 | B2 * | 12/2012 | Ide et al. | 318/400.02 |
| 8,446,118 | B2 * | 5/2013 | Kinugasa et al. | 318/432 |
| 2002/0113569 | A1 * | 8/2002 | Iijima et al. | 318/727 |
| 2005/0127857 | A1 * | 6/2005 | Miyauchi | 318/254 |
| 2008/0315816 | A1 * | 12/2008 | Hashimoto | 318/461 |
| 2009/0039808 | A1 * | 2/2009 | Hashimoto | 318/400.02 |
| 2010/0127648 | A1 * | 5/2010 | Akiyama | 318/400.11 |
| 2010/0156334 | A1 | 6/2010 | Nishimura et al. | |
| 2010/0207555 | A1 * | 8/2010 | Ide et al. | 318/400.02 |
| 2010/0244755 | A1 * | 9/2010 | Kinugasa et al. | 318/400.23 |
| 2014/0145654 | A1 * | 5/2014 | Zhang et al. | 318/400.02 |
| 2014/0346984 | A1 * | 11/2014 | Shiota et al. | 318/400.02 |

OTHER PUBLICATIONS

Zhu et al., "Compensation for Rotor Position Estimation Error Due to Cross-Coupling Magnetic Saturation in Signal Injection Based Sensorless Control of PM Brushless AC Motors," *Proceedings of the IEEE International Electric Machines and Drives Conference* (*IEMDC'07*), May 3, 2007, pp. 208-213.

Oda et al., "Position Estimation Error and Its Solution of Mechanical Sensorless PM Motor Drive," *Heisei 20 Nen National Convention Record, I.E.E. Japan, Industry Applications Society, The Institute of Electrical Engineers of Japan*, Aug. 27, 2008, pp. 1-273 to 1-276 (with English Abstract).

* cited by examiner

ROTATING ELECTRICAL MACHINE CONTROL DEVICE

INCORPORATION BY REFERENCE

The disclosure of Japanese Patent Application No. 2011-232067 filed on Oct. 21, 2011 including the specification, drawings and abstract is incorporated herein by reference in its entirety.

BACKGROUND OF THE INVENTION

The present invention relates to rotating electrical machine control devices that apply a high frequency current to a rotating electrical machine including a rotor having saliency, estimate the magnetic pole direction of the rotor on the basis of a high frequency component contained in a voltage command as a response component to the high frequency current, and control the rotating electrical machine.

DESCRIPTION OF THE RELATED ART

For example, a technique described in "Speed Control Method of Position Sensor less Salient-Pole PM Motor for Wide Speed Range Using High Frequency Current Injection" (Kazunori Yamada and two others, 2010, Proceedings of the Annual Conference of the Institute of Electrical Engineers of Japan, 4-356 to 357) is known regarding such rotating electrical machine control devices. In the technique of the literature, estimation control of the magnetic pole direction is designed on the basis of a voltage equation that does not take into consideration d-q axis magnetic flux interference in which a change in current on one of d and q-axes affects a magnetic flux on the other axis. Accordingly, an estimation error of the magnetic pole direction may occur in rotating electrical machines in which inductance saliency changes due to d-q axis magnetic flux interference.

SUMMARY OF THE INVENTION

A rotating electrical machine control device is therefore required which can suppress occurrence of an estimation error of the magnetic pole direction due to d-q axis magnetic flux interference even in rotating electrical machines in which d-q axis magnetic flux interference occurs.

According to an aspect of the present invention, a rotating electrical machine control device that applies a high frequency current to a rotating electrical machine including a rotor having saliency, estimates a magnetic pole direction of the rotor on the basis of a high frequency component contained in a voltage command as a response component to the high frequency current, and controls the rotating electrical machine includes: a high frequency superimposing section that sets an estimated d-q axis rotating coordinate system in which the estimated magnetic pole direction is defined as an estimated d-axis and a direction perpendicular to the estimated d-axis in terms of an electrical angle is defined as an estimated q-axis, and superimposes a high frequency current command as a command of the high frequency current on a current command to the rotating electrical machine in the estimated d-q axis rotating coordinate system; a magnetic pole direction adjusting section that sets a high frequency coordinate system having a phase difference of the high frequency current command with respect to the estimated d-q axis rotating coordinate system, and changes an estimated value of the magnetic pole direction so that a value on the high frequency coordinate system resulting from a coordinate transformation of the voltage command represented by the estimated d-q axis rotating coordinate system becomes closer to a high frequency target value whose initial value is set to zero; and a steady estimation error correcting section that calculates, regarding d-q axis magnetic flux interference in which a change in current on one of d and q axes affects a magnetic flux on the other axis, a magnetic flux interference estimation error as an error of the estimated value of the magnetic pole direction which is caused by the d-q axis magnetic flux interference, on the basis of the current command or a torque command to the rotating electrical machine, and corrects, on the basis of the magnetic flux interference estimation error, a phase of the high frequency current command for use in the coordinate transformation or the high frequency target value.

In the present application, the "rotating electrical machine" is used as a concept including all of an AC-driven motor (electric motor), an AC-driven generator (electric generator), and an AC-driven motor-generator that functions as both a motor and a generator as necessary.

As in the aspect, in the case where estimation control of the magnetic pole direction is configured to superimpose the high frequency current command on the current command in the estimated d-q axis rotating coordinate system and changes the estimated value of the magnetic pole direction so that the value on the high frequency coordinate system resulting from the coordinate transformation of the voltage command represented by the estimated d-q axis rotating coordinate system becomes closer to the high frequency target value, the influence of the inclination of a salient direction caused by the d-q axis magnetic flux interference appears as a phase shift in the coordinate transformation to the high frequency coordinate system and a shift of the value on the high frequency coordinate system resulting from the coordinate transformation. Such a phase shift in the coordinate transformation and a shift of the value resulting from the coordinate transformation cause the magnetic flux interference estimation error as the error of the estimated value of the magnetic pole direction.

According to the aspect, the magnetic flux interference estimation error is calculated on the basis of the current command or the torque command, and the phase of the high frequency current command for use in the coordinate transformation or the high frequency target value is corrected on the basis of the calculated magnetic flux interference estimation error. Accordingly, the phase shift in the coordinate transformation and the shift of the value resulting from the coordinate transformation can be compensated for before the magnetic flux interference estimation error is caused. This can suppress occurrence of an error due to magnetic flux interference.

The d-q axis magnetic flux interference is highly dependent on the operating point of the current represented by the d-q axis rotating coordinate system. Accordingly, calculating the magnetic flux interference estimation error on the basis of the current command on the estimated d-q axis rotating coordinate system allows the magnetic flux interference estimation error to be accurately calculated even if the operating point changes. Alternatively, calculating the magnetic flux interference estimation error on the basis of the torque command highly correlating with the operating point of the current represented by the d-q axis rotating coordinate system allows the magnetic flux interference estimation error to be accurately calculated even if the operating point changes. This can accurately suppress occurrence of the magnetic flux interference estimation error even if the operating point changes.

The steady estimation error correcting section may correct the phase of the high frequency current command or the high frequency target value also on the basis of an operation period estimation error as an error of the estimated value of the magnetic pole direction which is caused by an operation period of the voltage command in the estimated d-q axis rotating coordinate system, in addition to the magnetic flux interference estimation error.

As described above, the magnetic pole direction adjusting section estimates the magnetic pole direction on the basis of the voltage command represented by the estimated d-q axis rotating coordinate system. There is a time lag as processing delay caused by the operation period of the voltage command between the voltage command and the voltage to be applied to the rotating electrical machine. The time lag as the processing delay appears as a phase shift in the coordinate transformation to the high frequency coordinate system and a shift of the value on the high frequency coordinate system resulting from the coordinate transformation, as in the case of the d-q axis magnetic flux interference. Such a phase shift in the coordinate transformation and a shift of the value resulting from the coordinate transformation cause the operation period estimation error as the error of the estimated value of the magnetic pole direction.

The steady estimation error correcting section is configured to correct the phase of the high frequency current command for use in the coordinate transformation or the high frequency target value also on the basis of the operation period estimation error, in addition to the magnetic flux interference estimation error. This can suppress occurrence of an error caused by the processing delay, in addition to the error caused by the magnetic flux interference.

The steady estimation error correcting section may use as the operation period estimation error an error of the estimated value of the magnetic pole direction which is caused according to a phase as a product of a period that is 1.5 times the operation period of the voltage command and an angular frequency of the high frequency current command.

The processing delay time from the time when the operation of the voltage command is started to the time when the operation result is reflected on the voltage to be applied to the rotating electrical machine is a period that is 1.0 times the operation period, and the processing delay time generated by the voltage to be applied to the rotating electrical machine which changes in a stepped manner in every operation period is a period that is 0.5 times the operation period. The sum of these processing delay times is therefore a period that is 1.5 times the operation period. According to the above configuration, the operation period estimation error is the error of the estimated value of the magnetic pole direction which is caused according to the phase as the product of the period that is 1.5 times the operation period of the voltage command and the angular frequency of the high frequency current command. This allows the operation period estimation error to be accurately calculated.

DETAILED DESCRIPTION OF THE EMBODIMENTS

An embodiment of the present invention will be described with reference to the accompanying drawings.

A rotating electrical machine MG has a rotor and a stator. The stator is fixed to a non-rotating member, and the rotor is rotatably supported radially inward of the stator. In the present embodiment, the rotating electrical machine MG is an interior permanent magnet synchronous motor (IPMSM) having permanent magnets embedded in a rotor, and has saliency. Electromagnets may be embedded instead of the permanent magnets.

Figure 1:
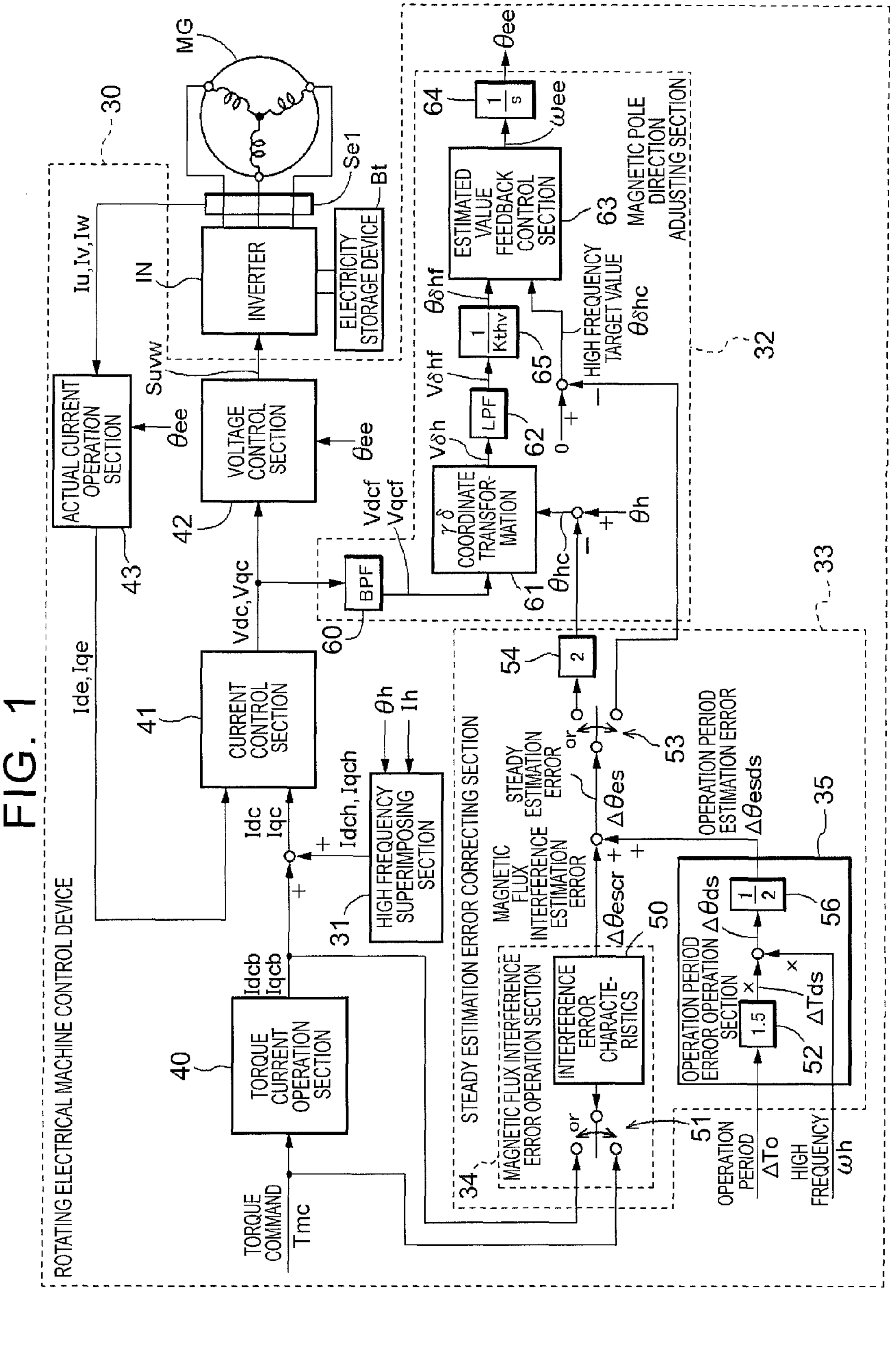
FIG. 1 is a block diagram showing the configuration of a rotating electrical machine control device according to an embodiment of the present invention.

As shown in FIG. 1, three-phase coils included in the stator of the rotating electrical machine MG are electrically connected to an electricity storage device Bt as a direct-current (DC) power supply via an inverter IN that performs direct current-alternating current (DC-AC) conversion. The rotating electrical machine MG is capable of functioning as a motor (electric motor) that is supplied with electric power to generate power, and as a generator (electric generator) that is supplied with power to generate electric power. The inverter IN includes a plurality of switching elements that convert DC power of the electricity storage device Bt to AC power to drive the rotating electrical machine MG, or that convert AC power generated by the rotating electrical machine MG to DC power to charge the electricity storage device Bt.

A rotating electrical machine control device 30 is a device that controls the rotating electrical machine MG via the inverter IN that performs power conversion between DC power of the DC power supply and AC power. As shown in FIG. 1, the rotating electrical machine control device 30 includes a torque current operation section 40, a current control section 41, a voltage control section 42, and an actual current operation section 43.

The torque current operation section 40 computes a d-q axis current command Idc, Iqc, which is obtained by representing a command value of a current to be applied to the rotating electrical machine MG in an estimated d-q axis rotating coordinate system described below, on the basis of a torque command Tmc. The actual current operation section 43 computes an estimated d-q axis actual current Ide, Iqe by carrying out a coordinate transformation from three-phase actual currents Iu, Iv, Iw flowing in the rotating electrical machine MG to a value on the estimated d-q axis rotating coordinate system, on the basis of an estimated magnetic pole position θee. The current control section 41 changes a d-q axis voltage command Vdc, Vqc, which is obtained by representing a command of a voltage to be applied to the rotating electrical machine MG in the estimated d-q axis rotating coordinate system so that the estimated d-q axis actual current Ide, Iqe becomes closer to the d-q axis current command Idc, Iqc. The voltage control section 42 converts the d-q axis voltage command Vdc, Vqc to a three-phase voltage command Vuc, Vvc, Vwc on the basis of the estimated magnetic pole position θee, and turns on/off the plurality of switching elements of the inverter IN on the basis of the three-phase voltage command Vuc, Vvc, Vwc to control a voltage to be applied to the rotating electrical machine MG.

The rotating electrical machine MG has no sensor that detects the rotational speed and the rotation angle of the rotor. The rotating electrical machine control device 30 is configured to estimate an actual magnetic pole position θer and an actual magnetic pole rotational speed ωer by a high frequency superimposing section 31, a magnetic pole direction adjusting section 32, and a steady estimation error correcting section 33. That is, the rotating electrical machine control device 30 is configured to apply a high frequency current to the rotating electrical machine MG including the rotor having saliency, estimate the magnetic pole direction of the rotor on the basis of a high frequency component contained in a voltage command as a response component to the high frequency current, and control the rotating electrical machine MG.

Specifically, the high frequency superimposing section 31 sets an estimated d-q axis rotating coordinate system in which the estimated magnetic pole direction is defined as an estimated d-axis and the direction perpendicular to (in the present embodiment, the direction that is advanced in phase by 90 degrees with respect to) the estimated d-axis in terms of the electrical angle is defined as an estimated q-axis, and superimposes a high frequency current command Idch, Iqch as a command of a high frequency current on the current command Idc, Iqc to the rotating electrical machine MG in the estimated d-q axis rotating coordinate system.

The magnetic pole direction adjusting section 32 sets a γ-δ axis coordinate system as a high frequency coordinate system having a difference of a phase θh of the high frequency current command Idch, Iqch (hereinafter referred to the "high frequency phase θh) with respect to the estimated d-q axis rotating coordinate system, and changes the estimated magnetic pole position θee as an estimated value of the magnetic pole direction so that a value on the γ-δ axis coordinate system resulting from a coordinate transformation of the voltage command Vdc, Vqc represented by the estimated d-q axis rotating coordinate system becomes closer to a high frequency target value θδhc whose initial value is set to zero.

In this configuration, the steady estimation error correcting section 33 is characterized by calculating, regarding d-q axis magnetic flux interference in which a change in current on one of the d and q-axes affects a magnetic flux on the other axis, a magnetic flux interference estimation error Δθescr as an error of an estimated value of the magnetic pole direction, which is caused by the d-q axis magnetic flux interference, on the basis of the d-q axis current command Idc, Iqc or the torque command Tmc to the rotating electrical machine MG, and correcting, on the basis of the magnetic flux interference estimation error Δθescr, a high frequency phase θh for use in the coordinate transformation to the γ-δ axis coordinate system or the high frequency target value θδhc.

Figure 2:
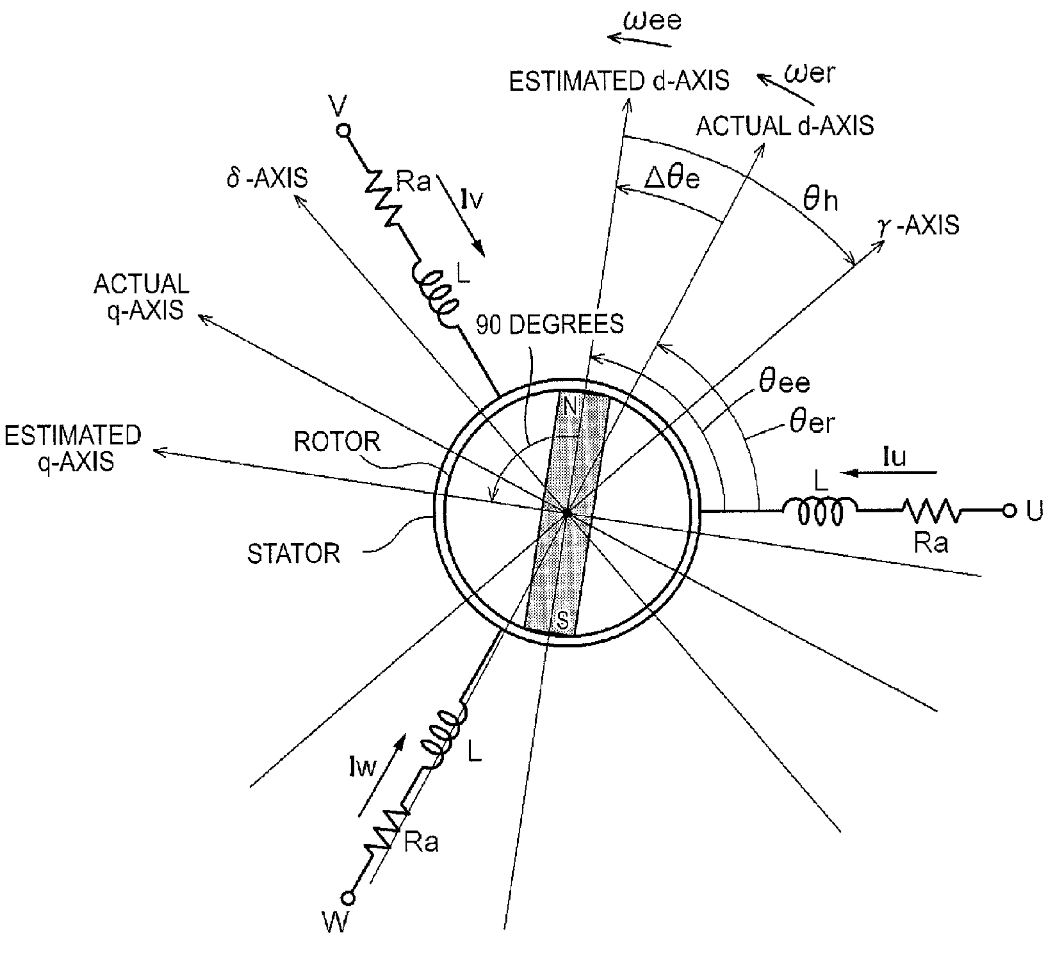
FIG. 2 is a diagram illustrating each coordinate system according to the embodiment of the present invention.

As a model is shown in FIG. 2, an actual d-q axis rotating coordinate system is a rotating coordinate system having an actual d-axis and an actual q-axis that rotate in synchronization with the electrical angle of the rotor.

The actual d-axis is defined as the direction of a field magnetic flux of the magnets included in the rotor (the magnetic pole (N pole) direction), and the actual q-axis is defined as the direction perpendicular to the actual d-axis in terms of the electrical angle. In the present embodiment, the actual q-axis is defined in the direction that is advanced in phase by 90 degrees with respect to the actual d-axis in terms of the electrical angle (the rotation direction of the rotor). In each figure according to the present embodiment, the rotation direction of the rotor is set to the counterclockwise direction, the phase advance direction (the direction in which the phase increases) is the counterclockwise direction, and the phase delay direction (the direction in which the phase decreases) is the clockwise direction. In the case where the rotation direction of the rotor is set to the clockwise direction, the phase advance direction is the clockwise direction, and the phase delay direction is the counterclockwise direction.

In the present embodiment, an electrical angle of the actual d-axis (the magnetic pole direction) is define as the actual magnetic pole position θer, and an electrical angle velocity of the actual d-axis (the magnetic pole direction) is defined as the actual magnetic pole rotational speed ωer, both based on the U-phase coil included in the stator.

The estimated d-axis and the estimated q-axis are the d-axis (the magnetic pole direction) and the q-axis which are estimated by the magnetic pole direction adjusting section 32, respectively. In the present embodiment, an electrical angle of the estimated d-axis is defined as the estimated magnetic pole position θee, and an electrical angle velocity of the estimated d-axis is defines as the estimated magnetic pole rotational speed ωee, both based on the U-phase coil.

The phase difference between the actual magnetic pole position θer and the estimated magnetic pole position θee is defined as an estimation error Δθe of the estimated d-axis with respect to the actual d-axis (=θee−θer).

Moreover, for estimation control of the magnetic pole direction, the γ-δ axis coordinate system is set which has a difference of the high frequency phase θh with respect to the estimated d-q axis rotating coordinate system having the estimated d-axis and the estimated q-axis. The γ-axis is defined in the opposite direction to the rotation direction of the high frequency current command Idch, Iqch, which is shifted in phase by the high frequency phase θh in terms of the electrical angle with respect to the estimated d-axis. The γ-axis rotates in this opposite direction at an angular frequency ωh of the high frequency current command Idch, Iqch (hereinafter referred to as the high frequency ωh) with respect to the estimated d-axis. The δ-axis is defined in the direction that is advanced by 90 degrees with respect to the γ-axis in terms of the electrical angle. The γ-δ axis coordinate system thus rotates in the opposite direction to the high frequency current command Idch, Iqch in the estimated d-q axis rotating coordinate system.

Figure 3:
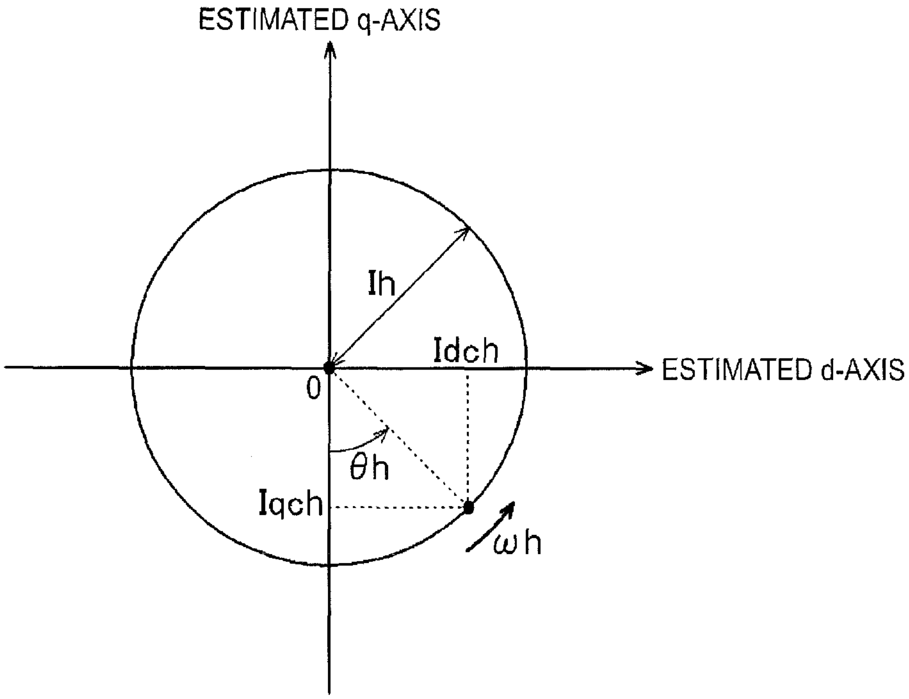
FIG. 3 is a diagram illustrating a high frequency current command according to the embodiment of the present invention.
Figure 4:
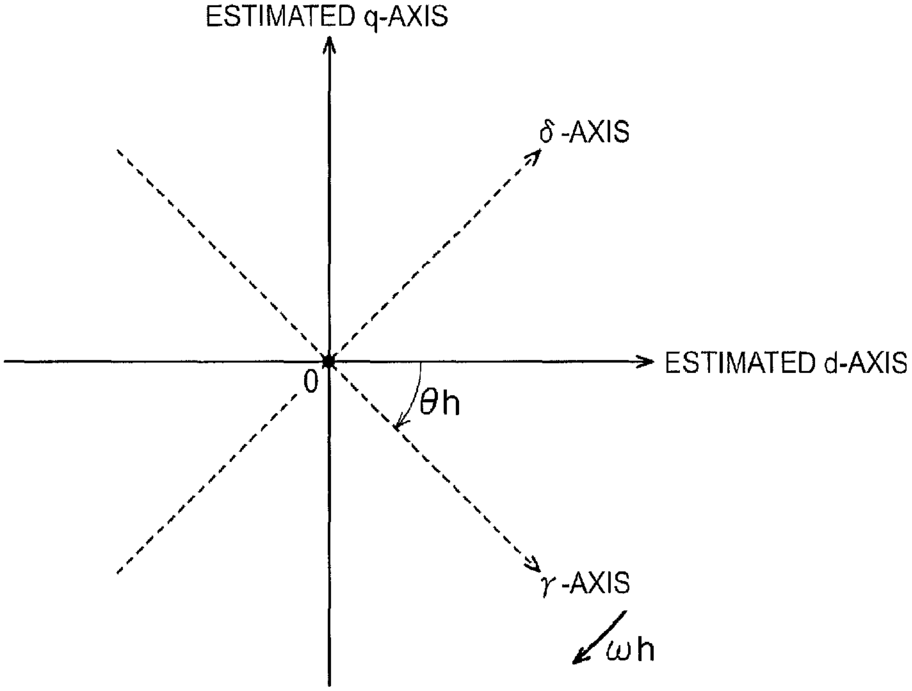
FIG. 4 is a diagram illustrating a γ-δ axis coordinate system according to the embodiment of the present invention.

In the present embodiment, as shown in FIG. 3, the high frequency current command Idch, Iqch is set so as to rotate at the high frequency ωh in the direction in which the phase is advanced (the rotation direction of the rotor) in the estimated d-q axis rotating coordinate system, as described in detail below. As shown in FIGS. 2 and 4, the γ-axis is thus defined in the direction that is delayed in phase by the high frequency phase θh in terms of the electrical angle (the opposite direction to the rotation direction of the rotor) with respect to the estimated d-axis. The γ-axis rotates at the high frequency ωh with respect to the estimated d-axis in the direction that is delayed in phase.

The rotating electrical machine control device 30 according to the present embodiment will be described in detail below.

1. Configuration of Rotating Electrical Machine Control Device 30

The configuration of the rotating electrical machine control device 30 that controls the rotating electrical machine MG will be described.

The rotating electrical machine control device 30 includes an arithmetic processing unit such as a CPU as a core member, and has a storage device such as a random access memory (RAM) capable of reading and writing data from and to the arithmetic processing unit and a read only memory (ROM) capable of reading data from the arithmetic processing unit. The function units 31 to 33, 40 to 43, etc. of the rotating electrical machine control device 30 as shown in FIG. 1 are formed by one or both of software (program) stored in the ROM etc. of the rotating electrical machine control device 30 and hardware such as an arithmetic circuit provided separately.

Electrical signals that are output from sensors such as a current sensor Se1 are input to the rotating electrical machine control device 30. The rotating electrical machine control device 30 calculates detection information of each sensor on the basis of the input electrical signals.

The current sensor Se1 is a sensor that detects a current flowing in the coil of each phase, and is provided on an electric wire connecting the inverter IN to the coil of each phase. The rotating electrical machine control device 30 detects three-phase actual currents Iu, Iv, Iw flowing in the coils of respective phases on the basis of the input signal from the current sensor Se1.

The rotating electrical machine control device 30 is a control device that controls operation of the rotating electrical machine MG. As shown in FIG. 1, the rotating electrical machine control device 30 includes function units such as the high frequency superimposing section 31, the magnetic pole direction adjusting section 32, the steady estimation error correcting section 33, the torque current operation section 40, the current control section 41, the voltage control section 42, and the actual current operation section 43. The function units operate cooperatively to control the rotating electrical machine MG.

1-1. Torque Current Operation Section 40

The torque current operation section 40 is a function unit that computes a d-q axis current command Idc, Iqc, which is obtained by representing a command value of a current to be applied to the rotating electrical machine MG in an estimated d-q axis rotating coordinate system, on the basis of a torque command Tmc to the rotating electrical machine MG The d-q axis current command Idc, Iqc computed by the torque current operation section 40 is output as a basic d-q axis current command Iqcb, Iqcb.

In the present embodiment, the torque current operation section 40 is configured to calculate such a d-axis current command Idc and a q-axis current command Iqc that cause torque of the torque command Tmc to be output from the rotating electrical machine MG. As shown as equal torque curves in FIG. 5A, there are a countless number of combinations of the d-axis current command Idc and the q-axis current command Iqc which cause torque of the same magnitude to be output from the rotating electrical machine MG. The torque current operation section 40 thus computes the d-q axis current command Idc, Iqc according to a current vector control method such as maximum torque current control, flux weakening control, Id=0 control, or maximum torque flux control. The maximum torque current control is a control method in which such a d-q axis current command Idc, Iqc that causes maximum torque to be generated for the same current is calculated. The flux weakening control is a control method in which a d-q axis current command Idc, Iqc is calculated so as to decrease a magnetic flux in the d-axis direction by using a demagnetization effect that is produced by a d-axis armature reaction, by causing a negative d-axis current to flow. The Id=0 control is a control method in which a d-axis current command Idc is set to 0 and a q-axis current command Iqc is changed according to a torque command Tmc. The maximum torque flux control is a control method in which a d-q axis current command Idc, Iqc is calculated so that an interlinkage magnetic flux is minimized when the same torque is generated.

Figure 5A:
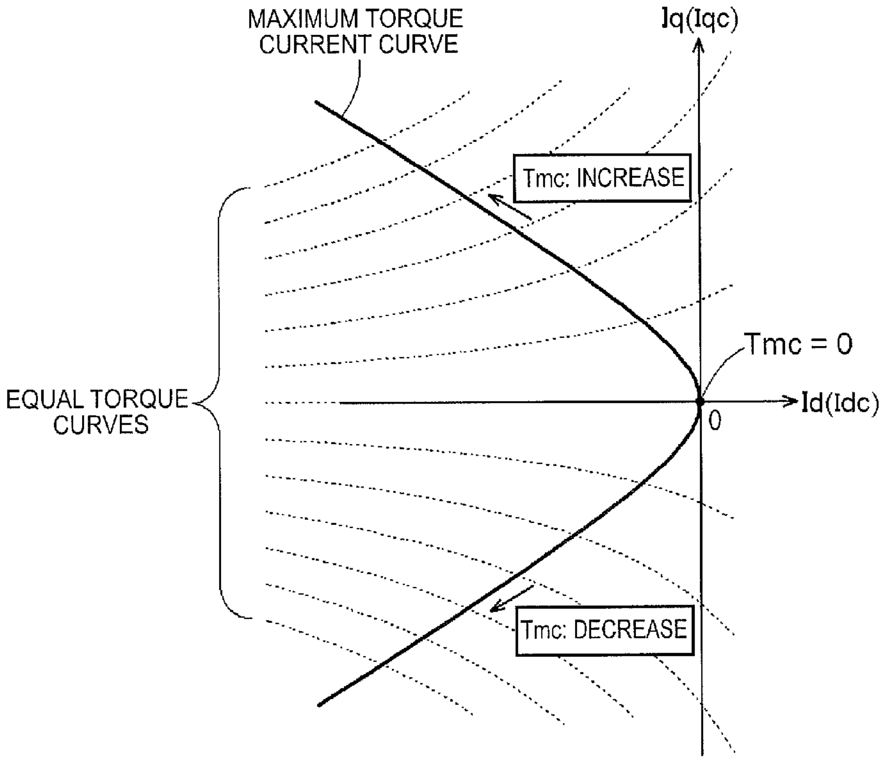
FIGS. 5A to 5C show diagrams illustrating setting of a d-q axis current command according to the embodiment of the present invention.

In the case where the maximum torque current control is used as the current vector control method, the torque current operation section 40 determines a d-q axis current command Idc, Iqc on such a maximum torque current curve as shown in FIG. 5A. The maximum torque current curve is a curve connecting possible values of a d-q axis current Id, Iq in the maximum torque current control.

In the case where the flux weakening control is used as the current vector control method, the torque current operation section 40 computes a d-q axis current command Idc, Iqc so as to decrease a magnetic flux in the d-axis direction by using a demagnetization effect that is produced by a d-axis armature reaction, by causing a negative d-axis current to flow. The d-q axis current command Idc, Iqc is determined on a constant induced voltage ellipse (voltage limit ellipse) corresponding to a modulation factor M (e.g., 0.78), a DC voltage, and a magnetic pole rotational speed which are set for the flux weakening control.

An example in which the maximum torque current control is performed will be described.

Figure 5B:
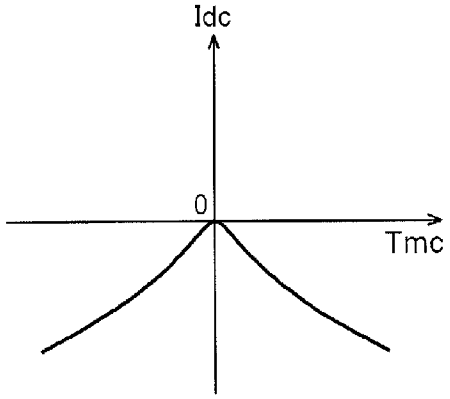
Figure 5C:
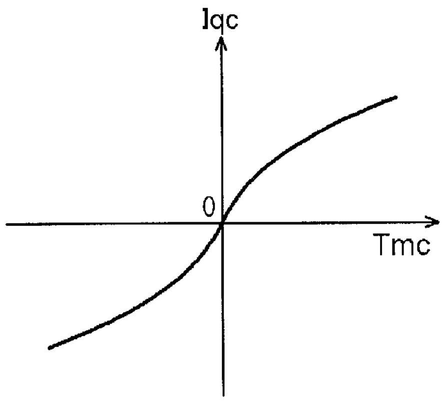

As shown in FIG. 5A, the torque current operation section 40 increases the q-axis current command Iqc from 0 and decreases the d-axis current command Idc from 0 along the maximum torque current curve as the torque command Tmc increases from 0. The torque current operation section 40 decreases the q-axis current command Iqc from 0 and decreases the d-axis current command Idc from 0 along the maximum torque current curve as the torque command Tmc decreases from 0. As relation characteristics of each current command Idc, Iqc to the torque command Tmc is shown in FIGS. 5B and 5C, the q-axis current command Iqc is calculated so as to monotonically increase as the torque command Tmc increases. If the torque command Tmc is less than 0, the d-axis current command Idc is calculated so as to monotonically increase as the torque command Tmc increases. If the torque command Tmc is larger than 0, the d-axis current command Idc is calculated so as to monotonically decrease as the torque command Tmc increases.

1-2. Actual Current Operation Section 43

The actual current operation section 43 is a function unit that computes an estimated d-q axis actual current Ide, Iqe by carrying out a coordinate transformation from three-phase actual currents Iu, Iv, Iw flowing in the rotating electrical machine MG to a value on an estimated d-q axis rotating coordinate system on the basis of an estimated magnetic pole position θee. In the present embodiment, the actual current operation section 43 carries out a three-phase to two-phase transformation and a rotating coordinate transformation from the actual currents Iu, Iv, Iw flowing in the coils of respective phases and detected by the current sensor Se1 to an estimated d-axis actual current Ide and an estimated q-axis actual current Iqe which are represented by the estimated d-q axis rotating coordinate system, on the basis of the estimated magnetic pole position θee.

1-3. Current Control Section 41

The rotating electrical machine control device 30 sets the sum of the basic d-q axis current command Idcb, Iqcb calculated by the torque current operation section 40 and the high frequency current command Idch, Iqch calculated by the high frequency superimposing section 31 as the d-q axis current command Idc, Iqc, as shown by Formula (1).

$$\begin{bmatrix} Idc \\ Iqc \end{bmatrix} = \begin{bmatrix} Idcb + Idch \\ Iqcb + Iqch \end{bmatrix} \quad (1)$$

The current control section 41 is a function unit that changes a d-q axis voltage command Vdc, Vqc so that the estimated d-q axis actual current Ide, Iqe becomes closer to the d-q axis current command Idc, Iqc.

The current control section 41 changes the d-q axis voltage command Vdc, Vqc so that the estimated d-q axis actual current Ide, Iqe follows the component of the high frequency current command Idch, Iqch superimposed on the d-q axis current command Idc, Iqc.

In the present embodiment, the current control section 41 includes a basic feedback controller, a decoupling controller, and an internal model controller. The current control section 41 calculates the d-q axis voltage command Vdc, Vqc by adding a basic voltage command Vbd, Vbq, a decoupling voltage command Vdd, Vdq, and an internal model voltage command Vid, Viq which are calculated by these controllers, as shown by Formula (2).

$$\begin{bmatrix} Vdc \\ Vqc \end{bmatrix} = \begin{bmatrix} Vbd + Vdd + Vid \\ Vbq + Vdq + Viq \end{bmatrix} \quad (2)$$

<Basic Feedback Controller>

The basic feedback controller calculates the basic voltage command Vbd, Vbq by performing a feedback operation on the basis of a current deviation ΔId, ΔIq between the d-q axis current command Idc, Iqc on which the high frequency current command Idch, Iqch is superimposed and the estimated d-q axis actual current Ide, Iqe.

In the present embodiment, the basic feedback controller is a proportional integral (PI) controller that calculates the basic voltage command Vbd, Vbq by performing a proportional operation and an integral operation on the basis of the current deviation ΔId, ΔIq, as shown in Formulae (3) and (4).

$$Vbd = \left(Kpd + Kid\frac{1}{s}\right)\Delta Id,\ \Delta Id = Idc - Ide \quad (3)$$

$$Vbq = \left(Kpq + Kiq\frac{1}{s}\right)\Delta Iq,\ \Delta Iq = Iqc - Iqe \quad (4)$$

Kpd represents a d-axis proportional gain, Kpq represents a q-axis proportional gain, Kid represents a d-axis integral gain, and Kiq represents a q-axis integral gain.

The basic feedback controller may be a controller that performs feedback control other than proportional integral (PI) control, such as proportional integral derivative (PID) control.

<Decoupling Controller>

The decoupling controller calculates a decoupling voltage command Vdd, Vdq by performing such a feedforward decoupling operation as shown in Formula (5) on the basis of the d-q axis current command Idc, Iqc so as to cancel the interaction between the d and q-axes.

$$Vdd = -(\omega ee\ Lq)Iqcb,\ Vdq = (\omega ee\ Ld)Idcb + \omega ee\Phi \quad (5)$$

Ld represents d-axis inductance, Lq represents q-axis inductance, and Φ represents an interlinkage magnetic flux generated by magnets.

In the present embodiment, the decoupling controller is configured to calculate the decoupling voltage command Vdd, Vdq on the basis of the basic d-q axis current command Idcb, Iqcb on which the high frequency current command Idch, Iqch is not superimposed.

<Internal Model Controller>

The internal model controller is a controller designed on the basis of the control theory of the internal model principle in order to improve the property of following the basic d-q axis current command Idcb, Iqcb that oscillates periodically by a periodic oscillating component if the periodic oscillating component is contained in the torque command Tmc.

As used herein, the internal model principle is control theory in which it is effective to introduce in a feedback system a controller having the same pole as that of a command value. The internal model controller calculates an internal model voltage command Vid, Viq by performing an operation using a harmonic model having characteristics of a periodic function of a frequency ωid, ωiq of an oscillating component contained in the basic d-q axis current command Idcb, Iqcb.

In the present embodiment, the internal model controller calculates an internal model voltage command Vid, Viq by performing an operation using a harmonic model having as a denominator a transfer function corresponding to a periodic function of a sine or cosine wave of a frequency ωid, ωiq, on the basis of the current deviation ΔId, ΔIq, as shown by Formulae (6) and (7).

$$Vid = \frac{Bd(s)}{s^2 + (\omega id)^2}\Delta Id \quad (6)$$

$$Viq = \frac{Bq(s)}{s^2 + (\omega iq)^2}\Delta Iq \quad (7)$$

The numerator Bd(s), Bq(s) of the transfer function of the harmonic model is set so as to ensure stability of a current feedback control system.

1-4. Voltage Control Section 42

The voltage control section 42 includes an AC voltage command calculating section and an inverter control section. The AC voltage command calculating section is a function unit that converts the d-q axis voltage command Vdc, Vqc to a three-phase voltage command Vuc, Vvc, Vwc on the basis of the estimated magnetic pole position θee. The inverter control section is a function unit that controls a voltage to be applied to the rotating electrical machine MG by turning on/off the plurality of switching elements of the inverter IN on the basis of the three-phase voltage command Vuc, Vvc, Vwc.

1-4-1. AC Voltage Command Calculation Section

<Pulse Width Modulation Control>

In the case where pulse width modulation control is set as a control method of the inverter IN, the AC voltage command calculating section carries out a fixed coordinate transformation and a two-phase to three-phase transformation from the d-q axis voltage command Vdc, Vqc represented by the estimated d-q axis rotating coordinate system to the three-phase voltage command Vuc, Vvc, Vwc as a voltage command to the individual three-phase coils, on the basis of the estimated magnetic pole position θee.

In the case where overmodulation pulse width modulation control is set, amplitude correction that distorts the three-phase voltage command Vuc, Vvc, Vwc is performed in addition to the fixed coordinate transformation and the two-phase to three-phase transformation so that the modulation factor M of a fundamental wave component in an output voltage waveform of the inverter IN matches a target modulation factor M.

The rotating electrical machine control device 30 is configured to calculate the modulation factor M on the basis of the d-q axis voltage command Vdc, Vqc and a DC voltage VH as shown by Formula (8). The DC voltage VH is a voltage of the electricity storage device Bt, which is detected by a voltage sensor.

$$M=\sqrt{Vdc^2+Vqc^2}/VH \quad (8)$$

<Square Wave Control>

In the case where square wave control is set as a control method of the inverter IN, the AC voltage command calculating section calculates a phase θv of a d-q axis voltage command vector represented by the estimated d-q axis rotating coordinate system according to Formula (9), and calculates the three-phase voltage command Vuc, Vvc, Vwc of a 1-pulse square wave having its phase adjusted, on the basis of the estimated magnetic pole position θee and the phase θv.

$$\theta v=\tan^{-}(-Vds/Vqc) \quad (9)$$

The d-q axis voltage command vector is a vector from the origin to the coordinate point of the d-q axis voltage command Vdc, Vqc in the estimated d-q axis rotating coordinate system. The phase θv of the d-q axis voltage command vector is a phase in electrical angle of the d-q axis voltage command vector with respect to the estimated q-axis.

The rotating electrical machine control device 30 sets a control mode such as the control method of the inverter IN and the current vector control method on the basis of the estimated magnetic pole rotational speed ωee, the torque command Tmc, the modulation factor M, etc.

1-4-2. Inverter Control Section

The inverter control section generates an inverter control signal Suvw that turns on/off the plurality of switching elements of the inverter IN on the basis of the three-phase voltage command Vuc, Vvc, Vwc.

<Pulse Width Modulation Control>

In the case where pulse width modulation control is set as a control method of the inverter IN, the inverter control section generates an inverter control signal Suvw that turns on/off the switching elements on the basis of the three-phase voltage command Vuc, Vvc, Vwc and a carrier. Typically, the inverter control signal Suvw is generated on the basis of the comparison result between the carrier as a triangular wave having amplitude of the DC voltage VH and the three-phase voltage command Vuc, Vvc, Vwc.

Alternatively, the inverter control section may be configured to generate an inverter control signal Suvw that turns on/off the switching elements on the basis of the modulation factor M, the phase θv of the d-q axis voltage command vector calculated on the basis of Formula (9), and the estimated magnetic pole position θee.

<Square Wave Control>

In the case where square wave control is set as a control method of the inverter IN, the inverter control section generates an inverter control signal Suvw that turns on/off the switching elements once each time in synchronization with the electrical angle of the rotor on the basis of the three-phase voltage command Vuc, Vvc, Vwc.

Alternatively, in the case where the square wave control is set, the AC voltage command calculating section may not calculate the three-phase voltage command Vuc, Vvc, Vwc, and the inverter control section may be configured to generate an inverter control signal Suvw directly on the basis of the estimated magnetic pole position θee and the phase θv of the d-q axis voltage command vector.

1-5. High Frequency Superimposing Section 31

The high frequency superimposing section 31 superimposes the high frequency current command Idch, Iqch on the d-q axis current command Idc, Iqc.

In the present embodiment, as shown by Formula (10) and FIG. 3, the high frequency superimposing section 31 sets the high frequency current command Idch, Iqch to a coordinate point that rotates at the high frequency ωh on a circle around the origin and with a radius Ih in the direction that is advanced in phase (the rotational direction of the rotor) in the estimated d-q axis rotating coordinate system. Accordingly, the rotational frequency of the high frequency current command Idch, Iqch with respect to the U-phase coil is higher than that of the estimated d-axis with respect to the U-phase coil, and thus serves as a high frequency component.

$$\begin{bmatrix} Idch \\ Iqch \end{bmatrix} = Ih\begin{bmatrix} \sin\theta h \\ -\cos\theta h \end{bmatrix} \quad (10)$$

1-6. Magnetic Pole Direction Adjusting Section 32

The magnetic pole direction adjusting section 32 is a function unit that changes the estimated magnetic pole position θee as an estimated value of the magnetic pole direction so that a value on the γ-δ axis coordinate system resulting from a coordinate transformation of the d-q axis voltage command Vdc, Vqc becomes closer to the high frequency target value θδhc whose initial value is set to zero.

As described above, in the estimated d-q axis rotating coordinate system, the high frequency current command Idch, Iqch is superimposed on the d-q axis current command Idc, Iqc, and the d-q axis voltage command Vdc, Vqc is changed by the current control section 41 so that the estimated d-q axis actual current Ide, Iqe follows the component of the high frequency current command Idch, Iqch. The estimated d-q axis high frequency actual current Idhe, Iqhe as a high frequency component contained in the estimated d-q axis actual current Ide, Iqe is thus applied to the rotating electrical machine MG.

As a result, an estimated d-q axis high frequency actual voltage Vdhe, Vqhe shown by Formula (11) is generated in the estimated d-q axis rotating coordinate system.

Formula (11) is obtained by carrying out a coordinate transformation from a voltage equation shown by Formula (17) described below, namely a voltage equation in the actual d-q rotating coordinate system in the case where no d-q axis magnetic flux interference occurs, to a voltage equation in the estimated d-q axis rotating coordinate system, substituting the estimated d-q axis high frequency actual current Idhe, Iqhe for the actual current Ide, Ique after the coordinate transformation to the estimated d-q axis rotating coordinate system, and rearranging the equation. It is herein assumed that the estimated d-q axis high frequency actual current Idhe, Iqhe follows the high frequency current command Idch, Iqch shown by Formula (10) without phase delay.

$$\begin{bmatrix} Vdhe \\ Vqhe \end{bmatrix} = RaIh\begin{bmatrix} \sin\theta h \\ -\cos\theta h \end{bmatrix} + LaveoIh(\omega h + \omega ee)\begin{bmatrix} \cos\theta h \\ \sin\theta h \end{bmatrix} - LdiffoIh(\omega h - 2\omega er + \omega ee)\begin{bmatrix} \cos(-\theta h - 2\Delta\theta e) \\ \sin(-\theta h - 2\Delta\theta e) \end{bmatrix} + \omega er\Phi\begin{bmatrix} -\sin(-\Delta\theta e) \\ \cos(-\Delta\theta e) \end{bmatrix} \tag{11}$$

$$\Delta\theta e = \theta ee - \theta er,\quad \theta h = \omega ht,$$

$$Laveo = \frac{Lq + Ld}{2},\quad Ldiffo = \frac{Lq - Ld}{2}$$

$$\begin{bmatrix} Idhe \\ Iqhe \end{bmatrix} = Ih\begin{bmatrix} \sin\theta h \\ -\cos\theta h \end{bmatrix}$$

Ld represents d-axis inductance, Lq represents q-axis inductance, Φ represents an interlinkage magnetic flux generated by magnets, and Ra represents coil resistance.

The first to third terms of the right side of Formula (11) are approximately the frequency component of the high frequency ωh if the estimation error Δθe changes slowly, and the fourth term of the right side is approximately a DC component thereof. Accordingly, as shown in Formula (12), only the first to third terms of the right side of Formula (11) can be extracted by performing bandpass filtering with the high frequency ωh as a center angular frequency on the estimated d-q axis high frequency actual voltage Vdhe, Vqhe.

$$\begin{bmatrix} Vdhef \\ Vqhef \end{bmatrix} = RaIh\begin{bmatrix} \sin\theta h \\ -\cos\theta h \end{bmatrix} + LaveoIh(\omega h + \omega ee)\begin{bmatrix} \cos\theta h \\ \sin\theta h \end{bmatrix} - LdiffoIh(\omega h - 2\omega er + \omega ee)\begin{bmatrix} \cos(-\theta h - 2\Delta\theta e) \\ \sin(-\theta h - 2\Delta\theta e) \end{bmatrix} \tag{12}$$

In the present embodiment, as shown in FIG. 1, a BPF 60 calculates a d-q axis filtered voltage command Vdcf, Vqcf by performing bandpass filtering on the d-q axis voltage command Vdc, Vqc so as to pass the components in the high frequency ωh band. The fourth term of the right side of Formula (11) can be removed and only the first to third terms of the right side can be extracted by the bandpass filtering. The component corresponding to the basic d-q axis current command Idcb, Iqcb contained in the d-q axis voltage command Vdc, Vqc can also be removed by the bandpass filtering.

Formula (13) is obtained by carrying out a coordinate transformation from an estimated d-q axis high frequency actual voltage Vdhef, Vqhef after the bandpass filtering shown by Formula (12) to a γ-δ axis high frequency voltage Vγh, Vδh represented by the γ-δ axis coordinate system.

$$\begin{bmatrix} V\gamma h \\ V\delta h \end{bmatrix} = \begin{bmatrix} \cos(-\theta h) & \sin(-\theta h) \\ -\sin(-\theta h) & \cos(-\theta h) \end{bmatrix}\begin{bmatrix} Vdhef \\ Vqhef \end{bmatrix} = RaIh\begin{bmatrix} \sin 2\theta h \\ -\cos 2\theta h \end{bmatrix} + LaveoIh(\omega h + \omega ee)\begin{bmatrix} \cos 2\theta h \\ \sin 2\theta h \end{bmatrix} - LdiffoIh(\omega h - 2\omega er + \omega ee)\begin{bmatrix} \cos(-2\Delta\theta e) \\ \sin(-2\Delta\theta e) \end{bmatrix} \tag{13}$$

In the present embodiment, a γ-δ coordinate transformation 61 carries out a coordinate transformation from the d-q axis filtered voltage command Vdcf, Vqcf to the γ-δ axis high frequency voltage Vγh, Vδh represented by the γ-δ axis coordinate system on the basis of a transformation high frequency phase θhc whose initial value is set to the high frequency phase θh, as shown by Formula (14).

$$\begin{bmatrix} V\gamma h \\ V\delta h \end{bmatrix} = \begin{bmatrix} \cos(-\theta hc) & \sin(-\theta hc) \\ -\sin(-\theta hc) & \cos(-\theta hc) \end{bmatrix}\begin{bmatrix} Vdcf \\ Vqcf \end{bmatrix} \tag{14}$$

In the case where the rotating electrical machine control device 30 is configured so as to correct the high frequency phase θh for use in the coordinate transformation to the γ-δ axis coordinate system by the steady estimation error correcting section 33 described below, the corrected value of the high frequency phase θh is set as the transformation high frequency phase θhc (θhc=θh−2Δθes). On the other hand, in the case where the rotating electrical machine control device 30 is configured so as not to correct the high frequency phase θh, the value of the high frequency phase θh is directly set as the transformation high frequency phase θhc (θhc=θh).

As described with reference to FIGS. 3 and 4, the high frequency current command Idch, Iqch and the γ-δ axis coordinate system rotate in the opposite directions at the high frequency ωh in the estimated d-q axis rotating coordinate system. Accordingly, Formula (13) is derived by adding the high frequency phase θh to each phase of the sine or cosine in Formula (12). The first and second terms of the right side of Formula (13) are components having a frequency double the high frequency ωh, and the component of the high frequency ωh is removed from the third term of the right side of Formula (13).

The third term of the right side of Formula (13) is a term related to the estimation error Δθr. Since the estimated error Δθe changes slowly as compared to the high frequency ωh, this third term appears as a low frequency component. Accordingly, if low pass filtering is performed on the γ-δ axis high frequency voltage Vγh, Vδr, only the third term of the right side of Formula (13) can be extracted as shown by Formula (15).

$$\begin{bmatrix} V\gamma hf \\ V\delta hf \end{bmatrix} = -LdiffoIh(\omega h - 2\omega er + \omega ee)\begin{bmatrix} \cos(-2\Delta\theta e) \\ \sin(-2\Delta\theta e) \end{bmatrix} \tag{15}$$

If the estimation error Δθe is very small, the estimation error Δθe can be approximated to sin(−2Δθe)≅−2Δθe as shown by Formula (16), and the δ-axis filtered high frequency voltage Vδhf is proportional to Δθe. Accordingly, if the estimated magnetic pole position θee is adjusted so that the δ-axis filtered high frequency voltage Vδhf is zero, the estimation error Δθe is zero and the estimated d-axis can be matched with the actual d-axis (θer=θee).

$$\begin{aligned} V\delta hf &= -LdiffoIh(\omega h - 2\omega er + \omega ee)\sin(-2\Delta\theta e) \\ &\cong 2LdiffoIh(\omega h - 2\omega er + \omega ee)\Delta\theta e = Kthv\Delta\theta e \end{aligned} \tag{16}$$

$$Kthv \cong 2LdiffoIh\omega h$$

The phase-voltage conversion gain Kthv corresponds to a phase-to-voltage conversion gain.

In the present embodiment, an LPF 62 calculates the δ-axis filtered high frequency voltage Vδhf by performing on the δ-axis high frequency voltage Vδh low pass filtering using a cutoff frequency lower than the frequency double the high frequency ωh. A unit converting section 65 calculates a δ-axis filtered high frequency phase θδhf by multiplying the δ-axis filtered high frequency voltage Vδhf by the reciprocal of the phase-voltage conversion gain Kthv (θδhf=Vδhf/Kthv).

An estimated feedback control section 63 performs feedback control to change the estimated magnetic pole rotational speed ωee so that the δ-axis filtered high frequency phase θδhf becomes closer to the high frequency target value θδhc. Various kinds of control such as proportional integral control can be used as the feedback control. An integrator 64 computes the estimated magnetic pole position θee by integrating the estimated magnetic pole rotational speed ωee. As described above, in the present embodiment, the rotating electrical machine control device 30 is configured to perform feedback control to change the estimated magnetic pole rotational speed ωwee corresponding to the actual magnetic pole rotational speed ωer that changes slightly as compared to the actual magnetic pole position θer that changes continuously by rotation. This can increase estimation accuracy of the estimated magnetic pole position θee in a steady state where the rotational speed does not change.

In the case where the steady estimation error correcting section 33 described below is configured to correct the high frequency target value θδhc, a corrected value of the high frequency target value θδhc is set as the high frequency target value θδhc (θδhc=0−Δθes). In the case where the steady estimation error correcting section 33 is configured so as not to correct the high frequency target value θδhc, zero is directly set as the high frequency target value θδhc (θδhc=0).

1-7. Steady Estimation Error Correcting Section 33

The steady estimation error correcting section 33 is a function unit that calculates, regarding d-q axis magnetic flux interference, the magnetic flux interference estimation error Δθescr as an error of the estimated magnetic pole position θee that is caused by the d-q axis magnetic flux interference, on the basis of the d-q axis current command Idc, Iqc or the torque command Tmc to the rotating electrical machine MG, and corrects, on the basis of the magnetic flux interference estimation error Δθescr, the high frequency phase θh for use in the coordinate transformation to the γ-δ axis coordinate system or the high frequency target value θδhc.

In the present embodiment, the steady estimation error correcting section 33 is configured to correct the high frequency phase θh for use in the coordinate transformation to the γ-δ axis coordinate system or the high frequency target value θδhc on the basis of an operation period estimation error Δθesds as the estimated magnetic pole position θee produced by an operation period ΔTo of the d-q axis voltage command Vdc, Vqc, in addition to the magnetic flux interference estimation error Δθescr.

That is, in the present embodiment, as shown in FIG. 1, the steady estimation error correcting section 33 calculates a steady estimation error Δθes by adding the magnetic flux interference estimation error Δθescr and the operation period estimation error Δθesds (Δθes=Δθescr+Δθesds).

In the case where the steady estimation error correcting section 33 is configured to correct the high frequency phase θh for use in the coordinate transformation to the γ-δ axis coordinate system, the steady estimation error correcting section 33 calculates the transformation high frequency phase θhc by subtracting a value that is double the steady estimation error Δθes from the high frequency phase θh (θhc=θh−2Δθes). In the case where the steady estimation error correcting section 33 is configured so as not to correct the high frequency phase θh, the high frequency phase θh is directly set as the transformation high frequency phase θhc (θhc=θh).

On the other hand, in the case where the steady estimation error correcting section 33 is configured to correct the high frequency target value θδhc, the steady estimation error correcting section 33 sets the high frequency target value θδhc by subtracting the steady estimation error Δθes from zero as its initial value (θδhc=0−Δθes). In the case where the steady estimation error correcting section 33 is configured not to correct the high frequency target value Δδhc, zero is directly set as the high frequency target value θδhc (θδhc=0).

Switches 51, 53 in FIG. 1 show alternative configurations in the steady estimation error correcting section 33 for convenience, and are actually not provided in the rotating electrical machine control device 30. Only a configuration corresponding to one of the configurations which is connected by the switches 51, 53 is provided in the rotating electrical machine control device 30, and the other configuration that is not connected by the switches 51, 53 is not provided in the rotating electrical machine control device 30.

The configuration of each part of the steady estimation error correcting section 33 will be described in detail below.

1-7-1. Magnetic Flux Interference Estimation Error Δθescr

First, the magnetic flux interference estimation error Δθescr will be described.

Estimation of the magnetic pole direction uses saliency caused by the q-axis inductance Lq being larger than the d-axis inductance Ld. That is, according to the principle described by using Formulae (11) to (16), the steady estimation error correcting section 33 is configured such that the q-axis direction is estimated as the protruding direction (major axis direction) of the locus of the estimated d-q axis high frequency actual voltage Vdhe, Vqhe as a response component to the estimated d-q axis high frequency actual current Idhe, Iqhe whose locus is a circle.

<In the Case where No d-q Axis Magnetic Flux Interference is Generated>

Unlike the rotating electrical machine MG according to the present embodiment, a voltage equation in the actual d-q axis rotating coordinate system in a rotating electrical machine in which no d-q axis magnetic flux interference is generated is as shown by Formula (17), where p represents a differential operator (d/dt).

$$\begin{bmatrix} Vd \\ Vq \end{bmatrix} = \begin{bmatrix} Ra & -\omega erLq \\ \omega erLd & Ra \end{bmatrix}\begin{bmatrix} Id \\ Iq \end{bmatrix} + p\begin{bmatrix} Ld & 0 \\ 0 & Lq \end{bmatrix}\begin{bmatrix} Id \\ Iq \end{bmatrix} + \begin{bmatrix} 0 \\ \omega er\Phi \end{bmatrix} \tag{17}$$

The d-q axis high frequency actual voltage Vdh, Vqh in the case where such a d-q axis high frequency actual current Idh, Iqh as shown by Formula (10) is applied to the rotating electrical machine MG can be approximated as shown by Formula (18). In this example, an approximation is made as ωer=0 and Ra=0 on the assumption that a high frequency current at the high frequency ωh that is sufficiently high relative to the actual magnetic pole rotational speed ωer is applied.

$$\begin{bmatrix} Vdh \\ Vqh \end{bmatrix} \cong \begin{bmatrix} LdIh\omega h\cos\theta h \\ LqIh\omega h\sin\theta h \end{bmatrix} \tag{18}$$

Figure 6A:
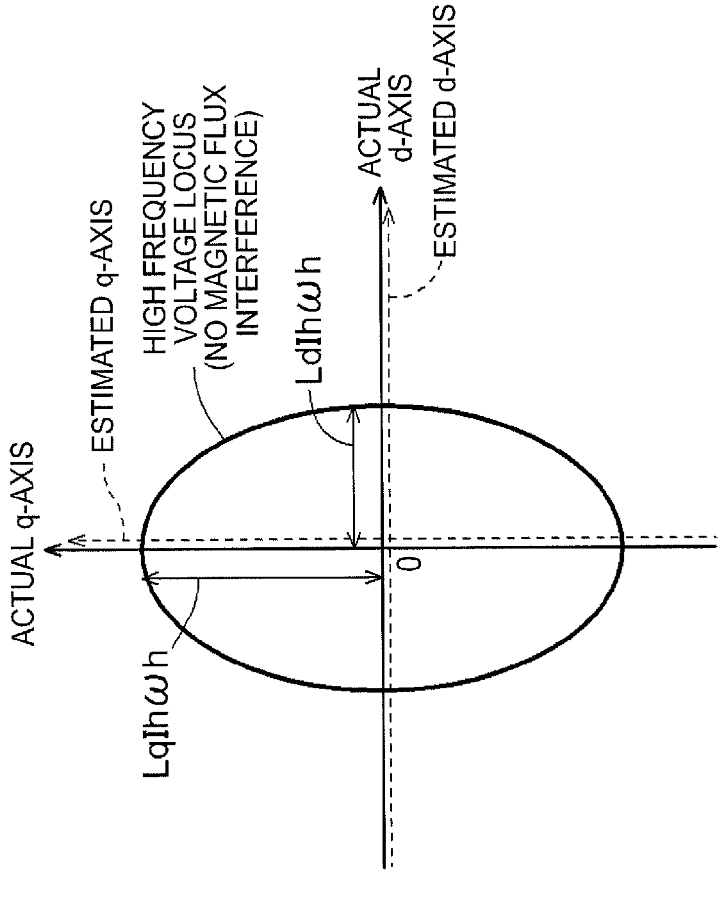
FIGS. 6A and 6B show diagrams for an estimation error that is caused by d-q axis magnetic flux interference according to the embodiment of the present invention.

The locus of the d-q axis high frequency actual voltage Vdh, Vqh shown by Formula (18) is an ellipse with its major axis (LqIhωh) in the q-axis direction and its minor axis (LdIhωh) in the d-axis direction due to saliency, as shown in FIG. 6A. That is, the salient direction of the inductance matches the q-axis direction.

Accordingly, in the case of the rotating electrical machine in which no d-q axis magnetic flux interference is generated, the estimated q-axis that is estimated as the protruding direction (major axis) of the high frequency voltage locus matches the actual q-axis, and thus no estimation error is caused by the d-q axis magnetic flux interference.

<In the Case where d-q Axis Magnetic Flux Interference is Generated>

Like the present embodiment, in the rotating electrical machine MG in which the d-q axis magnetic flux interference is generated, magnetic saturation occurs in the current vector direction (q-axis) if a current flowing in the rotating electrical machine MG becomes large. Such magnetic saturation generates mutual interference between the d and q axes, and thus generates d-q axis magnetic flux interference in which a change in current in one of the d and q axes affects the magnetic flux in the other axis.

In the case of the rotating electrical machine MG in which the d-q axis magnetic flux interference is generated, a voltage equation in the actual d-q axis rotating coordinate system is thus as shown by Formula (19).

$$\begin{bmatrix} Vd \\ Vq \end{bmatrix} = \begin{bmatrix} Ra & -\omega er Lq \\ \omega er Ld & Ra \end{bmatrix} \begin{bmatrix} Id \\ Iq \end{bmatrix} + p \begin{bmatrix} Ldh & Ldqh \\ Lqdh & Lqh \end{bmatrix} \begin{bmatrix} Id \\ Iq \end{bmatrix} + \begin{bmatrix} 0 \\ \omega er \Phi \end{bmatrix} \quad (19)$$

Ldh represents high frequency self-inductance of the d-axis, Lqh represents high frequency self-inductance of the q-axis, Ldqh represents high frequency mutual inductance of the d-axis which is generated by a q-axis current Iq, and Lqdh represents high frequency mutual inductance of the q-axis which is generated by a d-axis current Id. Each of the high frequency mutual inductances Ldqh, Lqdh is a component that is produced by the d-q axis magnetic flux interference.

Figure 7A:
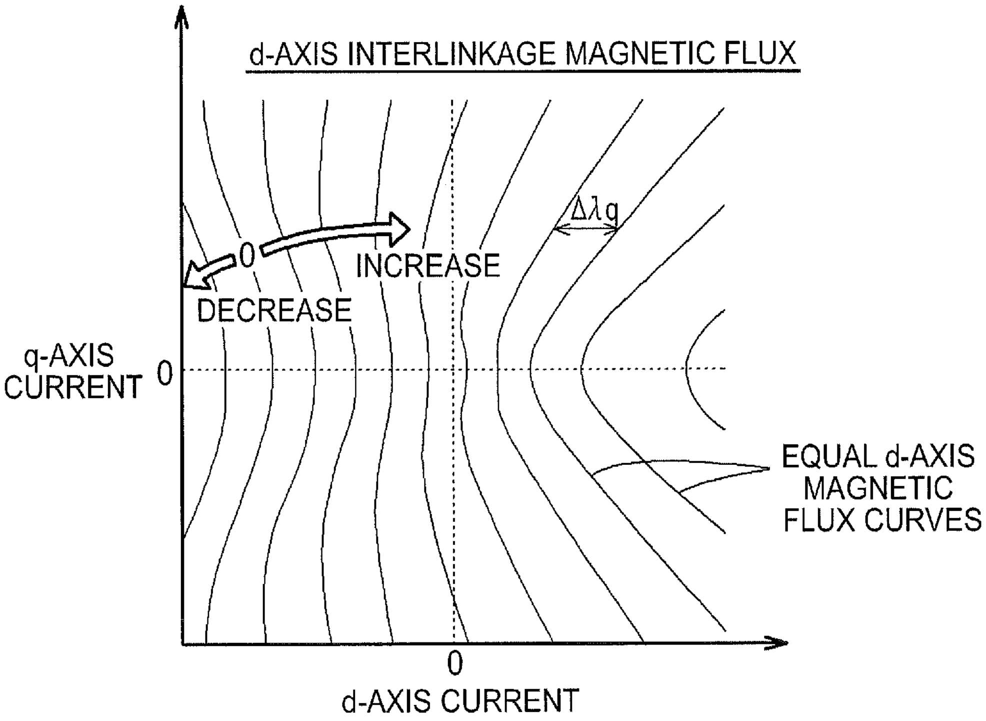
FIGS. 7A and 7B show diagrams illustrating d-q axis magnetic flux interference according to the embodiment of the present invention.
Figure 7B:
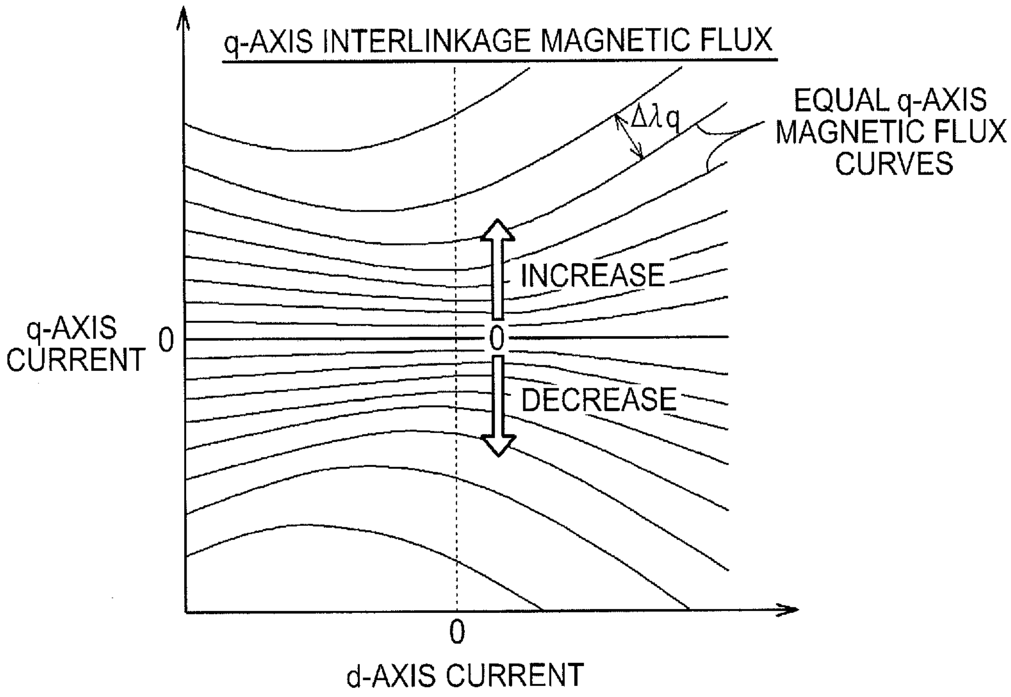

Each of the high frequency inductances Ldh, Lqh, Ldqh, Lqdh is obtained by Formula (20) using a d-axis interlinkage magnetic flux λd and a q-axis interlinkage magnetic flux λq which are a function of the d-axis current Id and the q-axis current Iq, as shown in the examples of FIGS. 7A and 7B.

$Ldh=[\lambda d(Id+\Delta Id,Iq)-\lambda d(Id,Iq)]/\Delta Id$ $Lqh=[\lambda q(Id,Iq+\Delta Iq)-\lambda q(Id,Iq)]/\Delta Iq$ $Ldqh=[\lambda d(Id,Iq+\Delta Iq)-\lambda d(Id,Iq)]/\Delta Iq$ $Lqdh=[\lambda q(Id+\Delta Id,Iq)-\lambda q(Id,Iq)]/\Delta Id$ \quad (20)

ΔId and ΔIq represent very small changes in d-axis current Id and q-axis current Iq, respectively.

As shown in the example of FIG. 7A, the d-axis interlinkage magnetic flux λd basically increases as the d-axis current Id increases. However, the d-axis interlinkage magnetic flux λd also changes as the q-axis current Iq changes due to the d-q axis magnetic flux interference. As shown in the example of FIG. 7B, the q-axis interlinkage magnetic flux λq basically increases as the q-axis current Iq increases. However, the q-axis interlinkage magnetic flux λq also changes as the d-axis current Id changes due to the d-q axis magnetic flux interference. Each of the interlinkage magnetic fluxes λd, λq has strongly nonlinear characteristics whose tendency changes according to the operating points of the d-axis current Id and the q-axis current Iq.

FIGS. 7A and 7B show equal magnetic flux curves of each of the interlinkage magnetic fluxes λd, λg at predetermined magnetic flux intervals Δλd, Δλq in the increasing or decreasing direction from a magnetic flux of 0. The equal magnetic flux curve shows a locus of the d-axis current Id and the q-axis current Iq corresponding to predetermined interlinkage magnetic fluxes λd, λq. Each of the interlinkage magnetic fluxes λd, λq can be obtained by FEM or experiments.

In the case where the d-q axis high frequency actual current Idh, Iqh whose locus is a circle in the actual d-q axis rotating coordinate system is applied to the rotating electrical machine MG, the d-q axis high frequency actual voltage Vdh, Vqh can be approximated as shown by Formula (21) if an approximation is made as ωer=0 and Ra=0 as in Formula (18).

$$\begin{bmatrix} Vdh \\ Vqh \end{bmatrix} \doteq p \begin{bmatrix} Ldh & Ldqh \\ Lqdh & Lqh \end{bmatrix} \begin{bmatrix} Idh \\ Iqh \end{bmatrix} \quad (21)$$

Figure 6B:
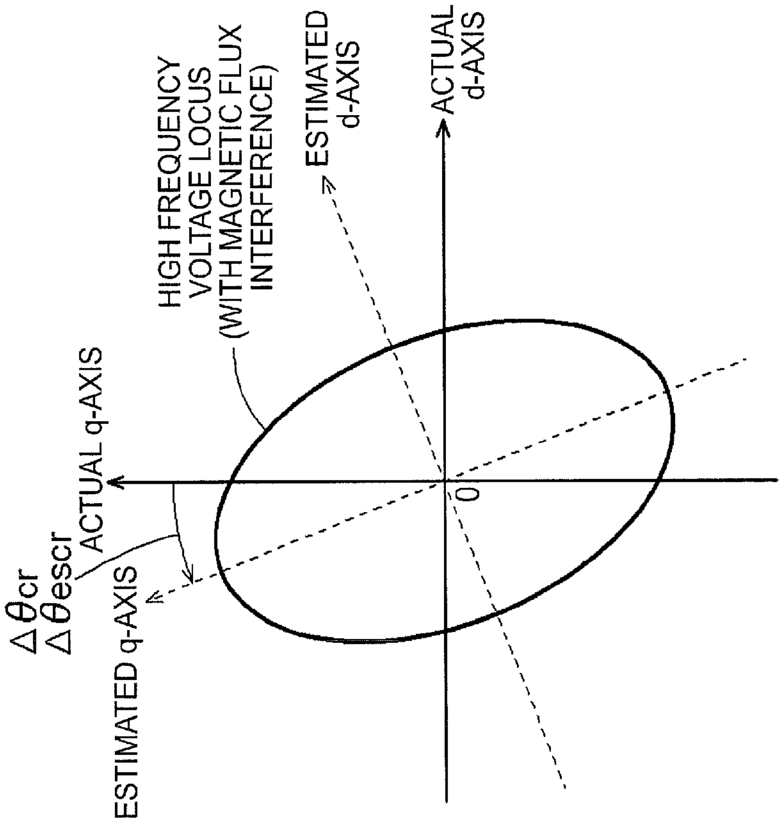

As shown in FIG. 6B, the locus of the d-q axis high frequency actual voltage Vdh, Vqh shown by Formula (21) is an ellipse whose major axis direction makes an argument Δθcr (hereinafter referred to as the magnetic flux interference argument Δθcr) to the actual q-axis due to the d-q axis magnetic flux interference. That is, the salient direction of the inductance is tilted with respect to the q-axis direction by the d-q axis magnetic flux interference.

Accordingly, in the case where the d-q axis magnetic flux interference is generated, the estimated q-axis estimated in the protruding direction (major axis direction) of the high frequency voltage locus has the magnetic flux interference estimation error Δθescr as the steady estimation error Δθe corresponding to the magnetic flux interference argument Δθcr.

A coordinate transformation is carried out from Formula (21) of the d-q axis high frequency actual voltage Vdh, Vqh in the actual d-q axis rotating coordinate system to the estimated d-q axis rotating coordinate system to obtain Formula (22) of the estimated d-q axis high frequency actual voltage Vdhe, Vqhe in the estimated d-q axis rotating coordinate system.

$$\begin{bmatrix} Vdhe \\ Vqhe \end{bmatrix} = T(\Delta \theta e) \begin{bmatrix} Vdh \\ Vqh \end{bmatrix} \quad (22)$$

$$= T(\Delta \theta e) \begin{bmatrix} Ldh & Ldqh \\ Lqdh & Lqh \end{bmatrix} T^{-1}(\Delta \theta e) p \begin{bmatrix} Idhe \\ Iqhe \end{bmatrix}$$

$$= \begin{bmatrix} Lave - Ldiff' \cos(2\Delta \theta e - 2\Delta \theta cr) & Ly + Ldiff' \sin(2\Delta \theta e - 2\Delta \theta cr) \\ -Ly + Ldiff' \sin(2\Delta \theta e - 2\Delta \theta cr) & Lave + Ldiff' \cos(2\Delta \theta e - 2\Delta \theta cr) \end{bmatrix} p \begin{bmatrix} Idhe \\ Iqhe \end{bmatrix}$$

$$T(\Delta \theta e) = \begin{bmatrix} \cos \Delta \theta e & \sin \Delta \theta e \\ -\sin \Delta \theta e & \cos \Delta \theta e \end{bmatrix}$$

$$Lave = \frac{Lqh + Ldh}{2},$$

$$Ldiff = \frac{Lqh - Ldh}{2},$$

$$Lx = \frac{Lqdh + Ldqh}{2}$$

$$Ly = \frac{Lqdh - Ldph}{2},$$

$$Ldiff' = \sqrt{Ldiff^2 + Lx^2}$$

$$\Delta \theta cr = \frac{1}{2} \arctan\left(\frac{Lqdh + Ldqh}{Ldh - Lqh}\right)$$

If the estimated d-q axis high frequency actual current Idhe, Iqhe corresponding to the high frequency current command Idch, Iqch shown by Formula (10) is applied to the rotating electrical machine MG, Formula (22) can be rearranged as shown by Formula (23).

$$\begin{bmatrix} Vdhe \\ Vqhe \end{bmatrix} = Ih\omega h \begin{bmatrix} Lave\cos\theta h + Ly\sin\theta h \\ -Ly\cos\theta h + Lave\sin\theta h \end{bmatrix} - Ldiff\,Ih\omega h \begin{bmatrix} \cos(-\theta h - 2\Delta\theta e + 2\Delta\theta cr) \\ \sin(-\theta h - 2\Delta\theta e + 2\Delta\theta cr) \end{bmatrix} \quad (23)$$

$$\begin{bmatrix} Idhe \\ Iqhe \end{bmatrix} = Ih \begin{bmatrix} \sin\theta h \\ -\cos\theta h \end{bmatrix}$$

The first term of the right side of Formula (23) corresponds to the second term of the right side of Formula (11), and the second term of the right side of Formula (23) corresponds to the third term of the right side of Formula (11). The γ-δ axis filtered high frequency voltage Vγhf, Vδhf corresponding to Formula (15) is changed to Formula (24) by the bandpass filtering, coordinate transformation to the γ-δ axis coordinate system, and low pass filtering using estimation control of the magnetic pole direction, which are described above.

$$\begin{bmatrix} V\gamma hf \\ V\delta hf \end{bmatrix} = -Ldiff\,Ih\omega h \begin{bmatrix} \cos(-2\Delta\theta e + 2\Delta\theta cr) \\ \sin(-2\Delta\theta e + 2\Delta\theta cr) \end{bmatrix} \quad (24)$$

The δ-axis filtered high frequency voltage Vδhf in Formula (24) can be approximated as shown by Formula (25).

$$V\delta hf = -Ldiff\,Ih\omega h\sin(-2\Delta\theta e + 2\Delta\theta cr) \doteq 2Ldiff\,Ih\omega h(\Delta\theta e - \Delta\theta cr) = Kthv(\Delta\theta e - \Delta\theta cr) \quad (25)$$

If the estimated magnetic pole position θee is adjusted by the estimation control of the magnetic pole direction so that the δ-axis filtered high frequency voltage Vδhf is zero, Δθe−Δθcr=0, causing the steady estimation error Δθe having a value equal to the magnetic flux interference argument Δθcr (Δθe=Δθcr). The steady estimation error Δθe that is caused by the magnetic flux interference argument Δθcr is defined as the magnetic flux interference estimation error Δθescr, as shown by Formula (26).

$$\Delta\theta escr = \Delta\theta cr \quad (26)$$

<Compensation for Magnetic Flux Interference Estimation Error Δθescr>

There are two methods to compensate for the magnetic flux interference estimation error Δθescr.

The first method is to correct the high frequency phase θh for use in the coordinate transformation to the γ-δ axis coordinate system. The second method is to correct the high frequency target value θδhc as a target value of the δ-axis filtered high frequency voltage Vδhf.

<Correction of the γ-δ Axis Coordinate System>

The first method will be described first.

In the first method, the high frequency phase θh for use in the coordinate transformation to the γ-δ axis coordinate system is corrected on the basis of the magnetic flux interference argument Δθcr (magnetic flux interference estimation error Δθescr) identified in advance.

Specifically, in the estimated d-q axis rotating coordinate system, a correction is made to shift the γ-axis by a phase double the magnetic flux interference argument Δθcr in the rotation direction of the high frequency current command Idch, Iqch (the opposite direction to the rotation direction of the γ-axis) to carry out a coordinate transformation to the interference-corrected γ-δ axis rotating coordinate system.

Figure 8:
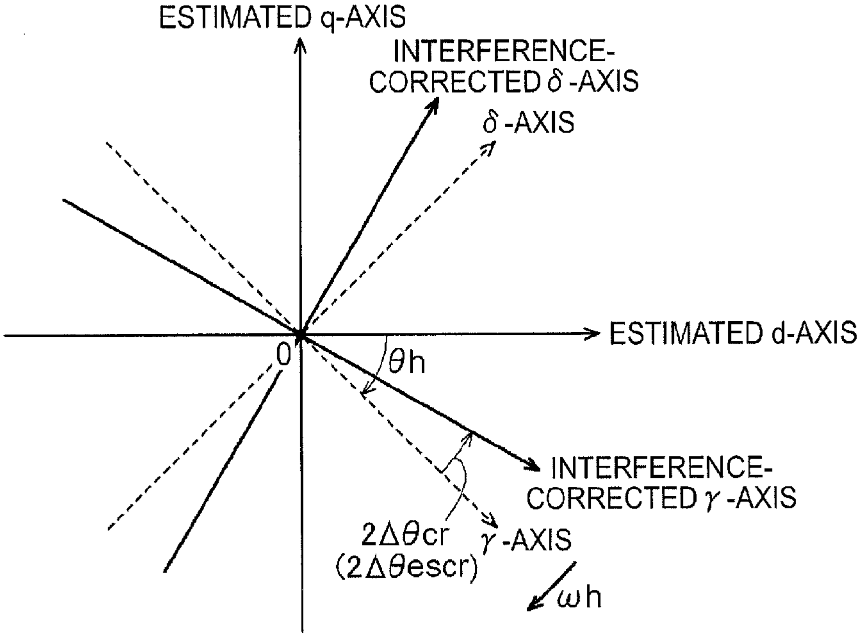
FIG. 8 is a diagram illustrating correction of a γ-δ axis coordinate system according to the embodiment of the present invention.

In the present embodiment, as shown in FIG. 8, since the rotation direction of the γ-axis is set to the direction that is delayed in phase (the opposite direction to the rotation direction of the rotor), a correction is made so that the γ-axis is shifted in the direction that is advanced in phase by a phase double the magnetic flux interference argument Δθcr (the rotation direction of the rotor). Accordingly, the interference-corrected γ-axis is defined in the direction that is delayed in phase with respect to the estimated d-axis by the high frequency phase θh minus the phase double the magnetic flux interference argument Δθcr (θhc=θh−2Δθcr).

Accordingly, in the coordinate transformation to the γ-δ axis coordinate system described using Formula (13), the coordinate transformation to the γ-δ axis coordinate system is carried out by advancing the phase with respect to −θh by the amount double the magnetic flux interference argument Δθcr. The γ-δ axis high frequency voltage Vγh, Vδh as shown by Formula (27) is obtained by carrying out a coordinate transformation from the estimated d-q axis high frequency actual voltage Vdhe, Vqhe shown by Formula (23) to the interference-corrected γ-δ axis coordinate system.

$$\begin{aligned} \begin{bmatrix} V\gamma h \\ V\delta h \end{bmatrix} &= \begin{bmatrix} \cos(-(\theta h - 2\Delta\theta cr)) & \sin(-(\theta h - 2\Delta\theta cr)) \\ -\sin(-(\theta h - 2\Delta\theta cr)) & \cos(-(\theta h - 2\Delta\theta cr)) \end{bmatrix} \begin{bmatrix} Vdhe \\ Vqhe \end{bmatrix} \\ &= Ih\omega h \begin{bmatrix} Lave\cos(2\theta h - 2\Delta\theta cr) + Ly\sin(2\theta h - 2\Delta\theta cr) \\ -Ly\cos(2\theta h - 2\Delta\theta cr) + Lave\sin(2\theta h - 2\Delta\theta cr) \end{bmatrix} - Ldiff\,Ih\omega h \begin{bmatrix} \cos(-2\Delta\theta e) \\ \sin(-2\Delta\theta e) \end{bmatrix} \end{aligned} \quad (27)$$

Since the first term of the right side of Formula (27) is removed by low pass filtering, the γ-δ axis filtered high frequency voltage Vγhf, Vδhf changes from Formulae (24) and (25) to Formula (28) by the interference correction.

$$\begin{bmatrix} V\gamma hf \\ V\delta hf \end{bmatrix} = -Ldiff\,Ih\omega h \begin{bmatrix} \cos(-2\Delta\theta e) \\ \sin(-2\Delta\theta e) \end{bmatrix} \quad (28)$$

$$V\delta hf \doteq 2Ldiff\,Ih\omega h\Delta\theta e = Kthv\Delta\theta e$$

The estimation error Δθe can be made equal to zero by adjusting the estimated magnetic pole position θee so that the δ-axis filtered high frequency voltage Vδhf of Formula (28) is zero. Accordingly, the estimation error Me can be made equal to zero by correcting the high frequency phase θh for use in the coordinate transformation to the γ-δ axis coordinate system on the basis of the magnetic flux interference argument Δθcr (magnetic flux interference estimation error Δθescr) identified in advance. This allows the magnetic flux interference estimation error Δθescr not to be generated.

<High Frequency Target Value θδhc>

Next, the second method will be described.

In the second method, the high frequency target value θδhc as a target value of the δ-axis filtered high frequency voltage Vδhf is corrected on the basis of the magnetic flux interference argument Δθcr (magnetic flux interference estimation error Δθescr) identified in advance.

Specifically, control is performed so that the product θδhf of the δ-axis filtered high frequency voltage Vδhf and the reciprocal of the phase-voltage conversion gain Kthv matches the high frequency target value θδhc, the high frequency target value θδhc is set as shown by Formula (29) so that the estimation error Δθe is 0.

$$\theta\delta hc = \frac{1}{Kthv}V\delta hf \cong \frac{1}{Kthv}2Ldiff\,Ih\omega h(\Delta\theta e - \Delta\theta cr) = 0 - \Delta\theta cr \qquad (29)$$

$$Kthv = 2Ldiff\,Ih\omega h$$

The phase-voltage conversion gain Kthv corresponds to a phase-to-voltage conversion gain.

Accordingly, the estimation error Δθe can be made equal to zero by correcting the high frequency target value θδhc on the basis of the magnetic flux interference argument Δθcr (magnetic flux interference estimation error Δθescr) identified in advance. This allows the magnetic flux interference estimation error Δθescr not to be generated.

<Magnetic Flux Interference Error Operation Section 34>

As shown in FIG. 1, a magnetic flux interference error operation section 34 included in the steady estimation error correcting section 33 calculates the magnetic flux interference estimation error Δθescr on the basis of the d-q axis current command Idc, Iqc or the torque command Tmc.

In the present embodiment, the magnetic flux interference error operation section 34 includes interference error characteristics 50 in which characteristics associated with the magnetic flux interference estimation error Δθescr are set in advance. In the present embodiment, relational characteristics between the d-q axis current Id, Iq or the output torque of the rotating electrical machine MG and the magnetic flux interference estimation error Δθescr are set in advance in the interference error characteristics 50. The magnetic flux interference error operation section 34 is configured to calculate the magnetic flux interference estimation error Δθescr by using the interference error characteristics 50, on the basis of the d-q axis current command Idc, Iqc or the torque command Tmc.

In the present embodiment, as shown in FIG. 1, the magnetic flux interference error operation section 34 is configured to calculate the magnetic flux interference estimation error Δθescr on the basis of the basic d-q axis current command Idcb, Iqcb before addition of the high frequency current command Idch, Iqch. The magnetic flux interference error operation section 34 may be configured to calculate the magnetic flux interference estimation error Δθescr on the basis of the d-q axis current command Idc, Iqc after addition of the high frequency current command Idch, Iqch, or the estimated d-q axis actual current Ide, Iqe computed by the actual current operation section 43.

<When Based on d-q Axis Current Command Idc, Iqc>

Figure 9:
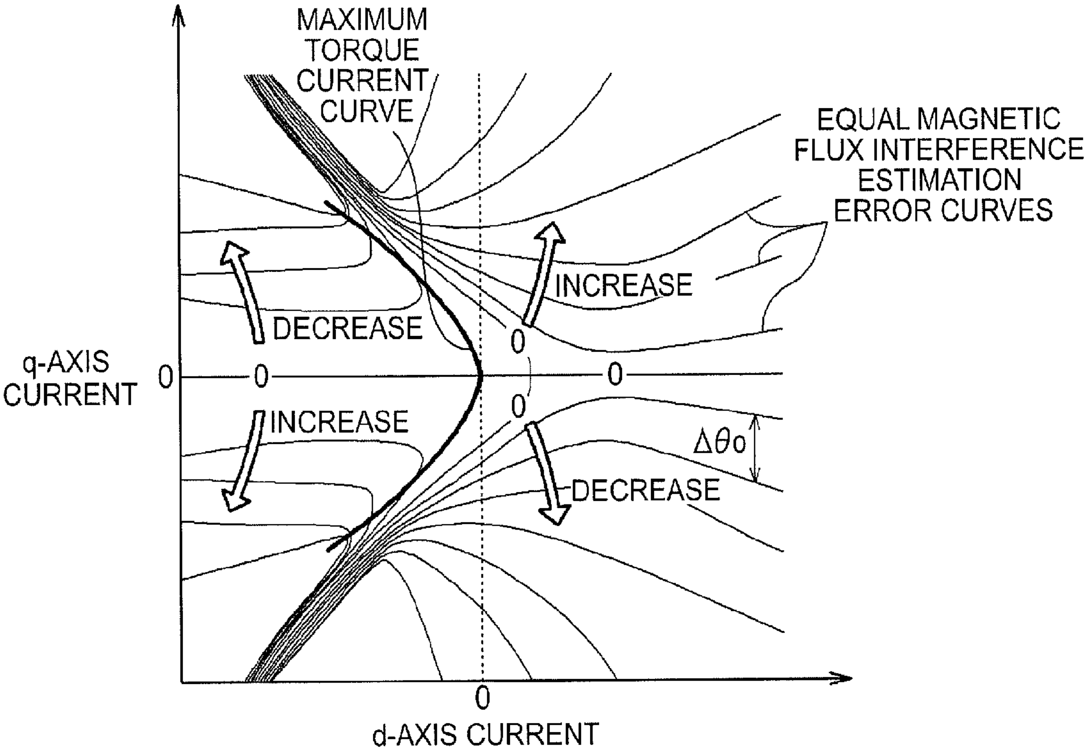
FIG. 9 is a diagram illustrating calculation of a magnetic flux interference estimation error based on a d-q axis current command according to the embodiment of the present invention.

In the case where the interference error characteristics 50 are the relational characteristics between the d-q axis current Id, Iq and the magnetic flux interference estimation error Δθescr, the interference error characteristics 50 have characteristics of a three-dimensional map as in the example of FIG. 9. FIG. 9 shows equal magnetic flux interference estimation error curves at predetermined estimation error intervals Δθo in the increasing or decreasing direction from an estimation error of 0. The equal magnetic flux interference estimation error curve shows a locus of the d-axis current Id and the q-axis current Iq corresponding to a predetermined magnetic flux interference estimation error Δθescr.

As shown in the example of FIG. 9, the magnetic flux interference estimation error Δθescr is a characteristic that decreases from zero as the q-axis current Iq increases from zero and that increases from zero as the q-axis current Iq decreases from zero, as viewed along the maximum torque current curve. When the q-axis current Iq is close to zero, the magnetic flux interference estimation error Δθescr is close to zero. As the absolute value of the q-axis current Iq increases, magnetic saturation increases, and the absolute value of the magnetic flux interference estimation error Δθescr increases. The magnetic flux interference estimation error Δθescr has strongly nonlinear characteristics whose tendency changes according to the operating point of the d-q axis current Id, Iq.

<When Based on Torque Command Tmc>

Figure 10:
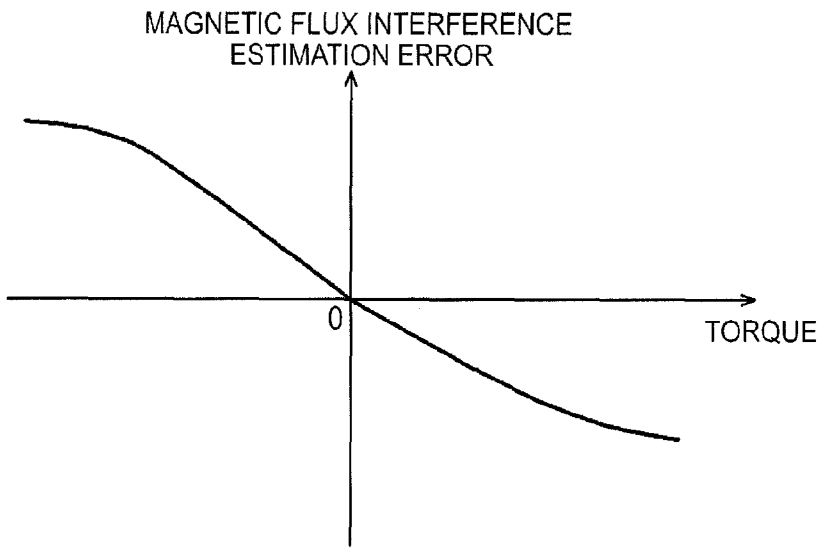
FIG. 10 is a diagram illustrating calculation of a magnetic flux interference estimation error based on a torque command according to the embodiment of the present invention.

In the case where the interference error characteristics 50 are the relational characteristics between the output torque of the rotating electrical machine MG and the magnetic flux interference estimation error Δθescr, the interference error characteristics 50 have characteristics of a two-dimensional map as in the example of FIG. 10.

As described above, the basic d-q axis current command Idcb, Iqcb is determined on the basis of the torque command Tmc according to a control law that is set for every current vector control method such as the maximum torque current curve. Accordingly, as in the case of the maximum torque current control shown in FIGS. 5B and 5C, there is a predetermined correspondence relation between the torque command Tmc and the basic d-q axis current command Idcb, Iqcb for every current vector control method. The operating point of the basic d-q axis current command Idcb, Iqcb is specified according to the torque command Tmc. The magnetic flux interference estimation error Δθescr at the specified operating point of the basic d-q axis current command Idcb, Iqcb can be obtained by using such characteristics as shown in FIG. 9. Accordingly, there are predetermined relational characteristics between the output torque of the rotating electrical machine MG and the magnetic flux interference estimation error Δθescr for every current vector control method, and the relational characteristics for every current vector control method are set in advance in the interference error characteristics 50. The magnetic flux interference error operation section 34 is configured to calculate the magnetic flux interference estimation error Δθescr by using the relational characteristics corresponding to the set current vector control method.

FIG. 10 shows an example of the relational characteristics in the case of the maximum torque current control. The magnetic flux interference estimation error Δθescr decreases from zero as the output torque increases from zero, and increases from zero as the output torque decreases from zero.

When the output torque is close to zero, the magnetic flux interference estimation error Δθescr is close to zero. As the absolute value of the output torque increases, magnetic saturation increases, and the absolute value of the magnetic flux interference estimation error Δθescr increases.

<Set Value of Interference Error Characteristics 50>

The value of the magnetic flux interference estimation error Δθescr that is set in the interference error characteristics 50 is set to a pre-calculated value on the basis of each high frequency inductance Ldh, Lqh, Ldqh, Lqdh obtained by FEM or experiments by using Formula (30) corresponding to a theoretical formula representing the relation between the magnetic flux interference argument Δθcr shown by Formula (22) and each high frequency inductance. Alternatively, the value of the interference error characteristics 50 is set to a pre-measured value of the magnetic flux interference estimation error δθescr which is obtained by experiments.

$$\Delta\theta escr = \frac{1}{2}\arctan\left(\frac{Lqdh + Ldqh}{Ldh - Lqh}\right) \tag{30}$$

Alternatively, the interference error characteristics 50 may be relational characteristics between the d-q axis current Id, Iq or the output torque and each high frequency inductance Ldh, Lqh, Ldqh, Lqdh. In this case, the magnetic flux interference estimation error Δθescr is calculated according to Formula (30) corresponding to a theoretical formula representing the relation between the magnetic flux interference argument Δθcr shown by Formula (22) and each high frequency inductance, on the basis of each high frequency inductance Ldh, Lqh, Ldqh, Lqdh calculated by using the interference error characteristics 50.

1-7-2. Operation Period Estimation Error Δθesds

The operation period estimation error Δθesds will be described.

The voltage equation of Formula (11) which is used as a base for the estimation control of the magnetic pole direction is based on the assumption that an actual current and an actual voltage at the same point in time are used.

In the rotating electrical machine control device 30, the magnetic pole direction adjusting section 32 is configured to estimate the magnetic pole direction on the basis of the d-q axis voltage command Vdc, Vqc as a voltage command instead of the actual voltage, as shown in FIG. 1. As described below, since there are a time lag and a phase difference between the voltage command and the actual voltage due to processing delay, the steady estimation error Δθe is caused.

The rotating electrical machine control device 30 is a discrete controller, and starts an operation cycle of performing processing of each control section in order once every predetermined operation period ΔTo.

The rotating electrical machine control device 30 is configured to obtain an output signal of each sensor such as the current sensor Se1 and update parameters such as the high frequency phase θh and the estimated magnetic pole position θee which are used in common in each control section at the time close to the start time of each operation cycle, and then to execute processing of each control section on the basis of such information. Accordingly, each control value computed in the same operation cycle can be regarded as being operated at the start time of this operation cycle. That is, the estimated d-q axis actual current Ide, Iqe, the d-q axis voltage command Vdc, Vqc, the high frequency phase θh, etc. can be regarded as being computed at the start time of an operation cycle.

Figure 11:
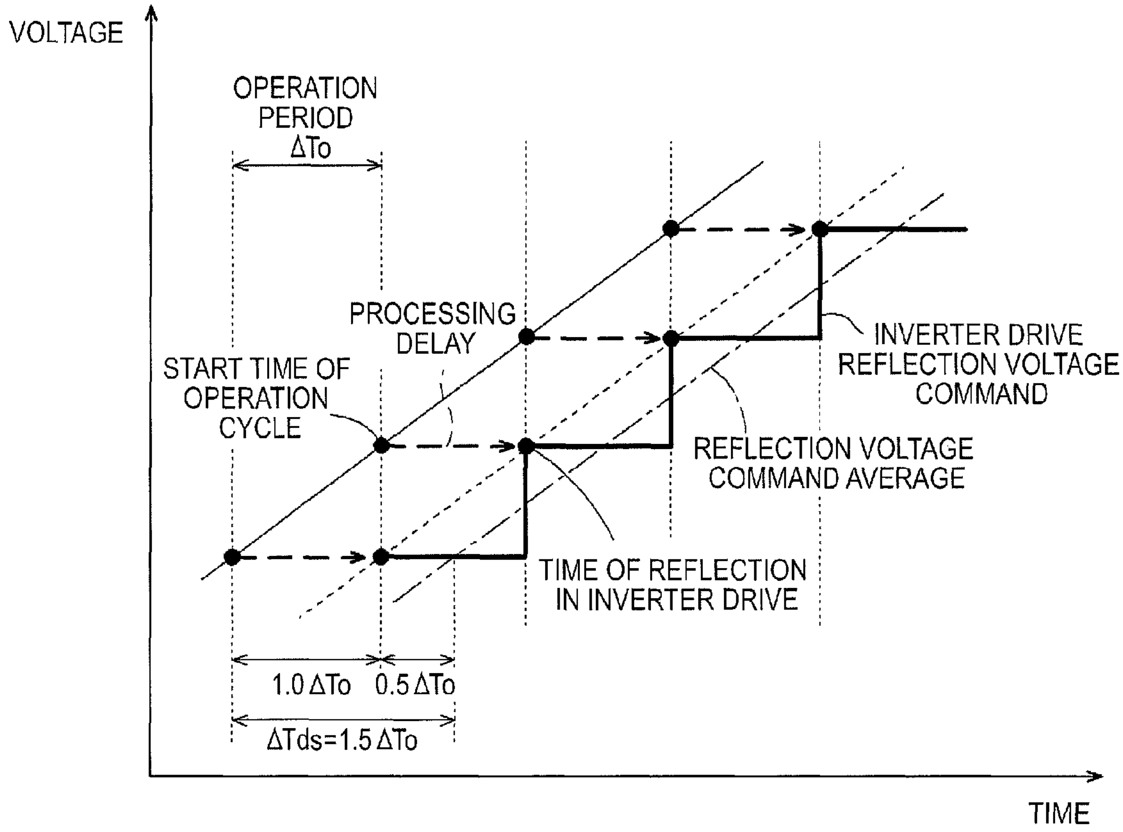
FIG. 11 is a diagram illustrating an operation period estimation error according to the embodiment of the present invention.

However, as shown in FIG. 11, processing delay is caused by the current control section 41, the voltage control section 42, etc. between the start time of an operation cycle when the d-q axis voltage command Vdc, Vqc is regarded as being computed and the time when the calculated d-q axis voltage command Vdc, Vqc is reflected in the voltage to be applied to the rotating electrical machine MG. Accordingly, since the voltage information that is used by the magnetic pole direction adjusting section 32 is information that advances by processing delay time ΔTds with respect to the actual current and the actual voltage, the estimation error Δθe according to the processing delay time ΔTds is caused. The processing delay time ΔTds will be described later.

Figure 12:
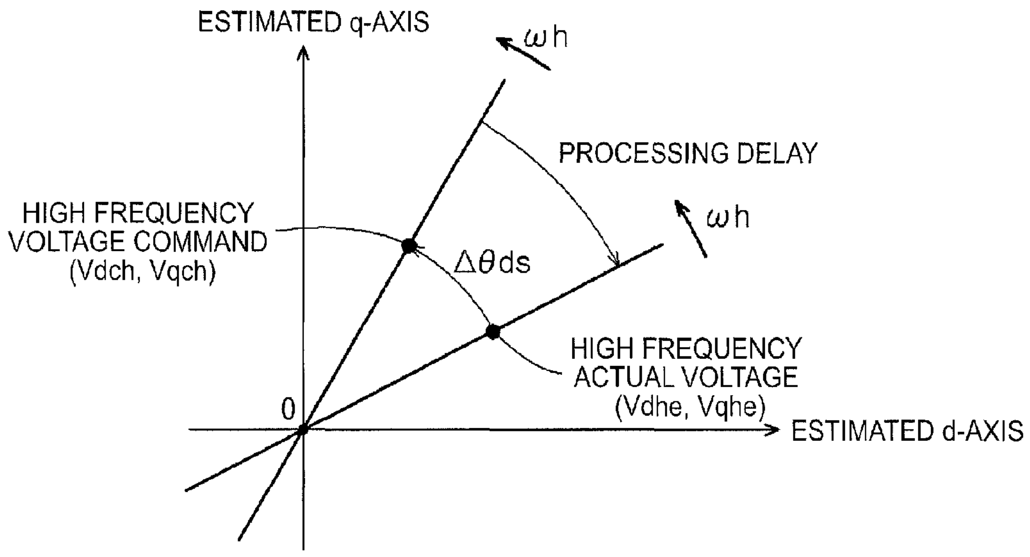
FIG. 12 is a diagram illustrating an operation period estimation error according to the embodiment of the present invention.

As shown in FIG. 12 and Formula (31), the d-q axis high frequency voltage command Vdch, Vqch as a component of the high frequency ωh contained in the d-q axis voltage command Vdc, Vqc advances in phase by a processing delay phase Δθds that is generated by the processing delay with respect to the estimated d-q axis high frequency actual voltage Vdhe, Vqhe. The processing delay phase Δθds is a phase as the product of the processing time delay ΔTds and the high frequency ωh.

$$\begin{bmatrix} Vdch \\ Vqch \end{bmatrix} = \begin{bmatrix} \cos\Delta\theta ds & -\sin\Delta\theta ds \\ \sin\Delta\theta ds & \cos\Delta\theta ds \end{bmatrix}\begin{bmatrix} Vdhe \\ Vqhe \end{bmatrix} \tag{31}$$

$$\Delta\theta ds = \omega h \Delta Tds$$

Formula (32) for the d-q axis high frequency voltage commands Vdch, Vqch and the estimated d-q axis high frequency actual current Idhe, Iqhe is obtained by substituting Formula (11) into Formula (31) to rearrange Formula (31).

$$\begin{bmatrix} Vdch \\ Vqch \end{bmatrix} = Ralh\begin{bmatrix} \sin(\theta h + \Delta\theta ds) \\ -\cos(\theta h + \Delta\theta ds) \end{bmatrix} + LaveoIh(\omega h + \omega ee)\begin{bmatrix} \cos(\theta h + \Delta\theta ds) \\ \sin(\theta h + \Delta\theta ds) \end{bmatrix} - LdiffoIh(\omega h - 2\omega er + \omega ee)\begin{bmatrix} \cos(-\theta h - 2\Delta\theta e + \Delta\theta ds) \\ \sin(-\theta h - 2\Delta\theta e + \Delta\theta ds) \end{bmatrix} + \omega er\Phi\begin{bmatrix} -\sin(-\Delta\theta e + \Delta\theta ds) \\ \cos(-\Delta\theta e + \Delta\theta ds) \end{bmatrix} \tag{32}$$

The γ-δ axis filtered high frequency voltage Vγhf, Vδhf corresponding to Formula (15) is shown by Formula (33) by performing the bandpass filtering, coordinate transformation to the γ-δ axis coordinate system, and low pass filtering using estimation control of the magnetic pole direction on Formula (32).

$$\begin{bmatrix} V\gamma hf \\ V\delta hf \end{bmatrix} = -LdiffoIh(\omega h - 2\omega er + \omega ee)\begin{bmatrix} \cos(-2\Delta\theta e - \Delta\theta ds) \\ \sin(-2\Delta\theta e + \Delta\theta ds) \end{bmatrix} \tag{33}$$

The δ-axis filtered high frequency voltage Vδhf in Formula (33) can be approximated as shown by Formula (34).

$$V\delta hf = -LdiffoIh(\omega h - 2\omega er + \omega ee)\sin(-2\Delta\theta e + \Delta\theta ds) \doteq 2LdiffoIh(\omega h - 2\omega er + \omega ee)\left(\Delta\theta e - \frac{1}{2}\Delta\theta ds\right) = Kthv\left(\Delta\theta e - \frac{1}{2}\Delta\theta ds\right) \tag{34}$$

If the estimated magnetic pole position θee is adjusted by the estimation control of the magnetic pole direction so that the δ-axis filtered high frequency voltage Vδhf is zero, Δθe−½Δθds=0, causing the steady estimation error Δθe having a value equal to half the processing delay phase Δθds (Δθe=½Δθds). The steady estimation error Δθe that is caused by the processing delay phase Δθds is defined as the operation period estimation error Δθesds, as shown by Formula (35).

$$\Delta\theta esds = \frac{1}{2}\Delta\theta ds \tag{35}$$

<Processing Delay Time ΔTds>

The processing delay time ΔTds will be described in detail below.

As shown in FIG. 11, processing delay is caused by the current control section 41, the voltage control section 42, etc. between the start time of an operation cycle when the d-q axis voltage command Vdc, Vqc is regarded as being computed and the time when the calculated d-q axis voltage command Vdc, Vqc is reflected in the voltage to be applied to the rotating electrical machine MG.

In the present embodiment, the d-q axis voltage command Vdc, Vqc is calculated and the three-phase voltage command Vuc, Vvc, Vwc is calculated on the basis of the d-q axis voltage command Vdc, Vqc during an operation cycle. However, the calculated three-phase voltage command Vuc, Vvc, Vwc is reflected in the processing of the inverter control section at the time the following operation cycle is started. In this following operation cycle, the voltage control section 42 controls three-phase AC voltages to be applied to the rotating electrical machine MG via the inverter IN on the basis of the three-phase voltage command Vuc, Vvc, Vwc calculated in the previous operation cycle. Processing delay equal to the operation cycle ΔTo is therefore caused between the start time of an operation cycle and the time the operation result is reflected in driving of the inverter IN.

During the same operation cycle, the voltage control section 42 performs drive control of the inverter IN on the basis of the three-phase voltage command Vuc, Vvc, Vwc updated at the start time of the operation cycle. That is, the three-phase voltage command Vuc, Vvc, Vwc updated at the start time of an operation cycle is held by zero-order hold during the operation cycle. Accordingly, even after the operation cycle is started, processing delay is caused in the voltage command that is reflected in driving of the inverter IN (hereinafter referred to as the inverter drive reflection voltage command). The average behavior of the inverter drive reflection voltage command that changes in a stepped manner is subjected to processing delay equal to half the operation period ΔTo with respect to the start time of the following operation cycle, as shown by the line of the reflection voltage command average in FIG. 11. That is, the inverter drive reflection voltage command that changes in a stepped manner by the zero-order hold is subjected to the processing delay equal to half the operation period ΔTo on average.

Accordingly, the processing delay time ΔTds is equal to 1.5ΔTo as the sum of 1.0×ΔTo due to reflection delay of the computed value of the voltage command and 0.5×ΔTo due to zero-order hold.

The processing delay due to the zero-order hold will be described by using formulae. In the case where the d-axis high frequency actual voltage Vdh represented by a continuous system shown by Formula (36) is discretized by using the zero-order hold of operation period ΔTo, the discretization can be represented by Formula (37).

$$Vdh(t) = LdIh\omega h\cos(\omega ht) \tag{36}$$

$$Vdh(n) = LdIh\frac{\sin(n\omega h\Delta To) - \sin((n-1)\omega h\Delta To)}{\Delta To} = \frac{2LdIh}{\Delta To}\sin\left(\frac{\omega h\Delta To}{2}\right)\cos\left(\left(n-\frac{1}{2}\right)\omega h\Delta To\right) \tag{37}$$

As can be understood from cos((n−0.5)ωhΔTo in Formula (37), discretizing the behavior of the continuous system of Formula (36) by using the zero-order hold generates the processing delay time ΔTds equal to 0.5ΔTo. Accordingly, the processing delay phase Δθds equal to 0.5ΔTo×ωh is generated.

<Operation Period Error Operation Section 35>

As shown in FIG. 1, an operation period error operation section 35 included in the steady estimation error correcting section 33 calculates the operation period estimation error Δθesds.

The operation period error operation section 35 uses as the operation period estimation error Δθesds the estimation error Δθe in the magnetic pole direction which is caused according to the phase as the product of the period that is 1.5 times the operation period ΔTo of the voltage command and the high frequency ωh.

In the present embodiment, the operation period error operation section 35 is configured to calculate the processing delay phase Δθds by multiplying the period that is 1.5 times the operation period ΔTo and the high frequency ωh, and to calculate the operation period estimation error Δθesd by multiplying the processing delay phase Δθds by the gain of 0.5. In the case where the operation period ΔTo and the high frequency ωh are fixed values, such multiplication as shown in FIG. 1 may not be performed, and the operation period estimation error Δθesds may be set to a predetermined value that is preset to 0.75×ΔTo×ωh.

Figure 13:
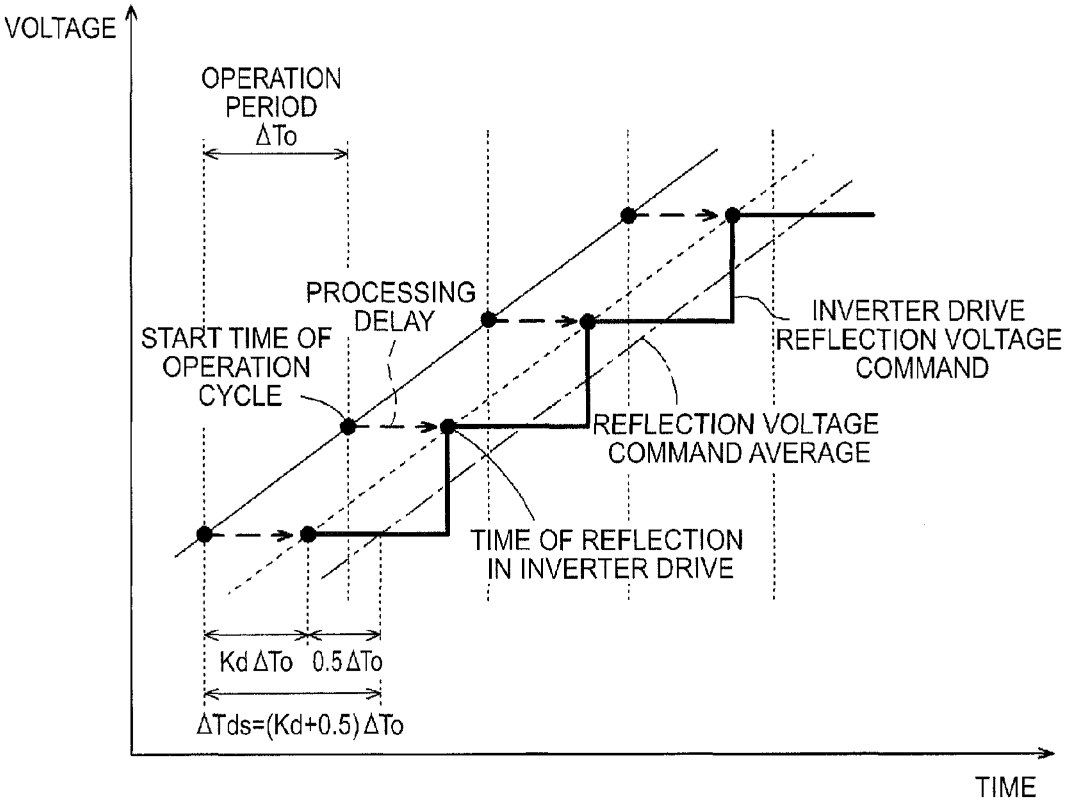
FIG. 13 is a diagram illustrating an operation period estimation error according to the embodiment of the present invention.

As shown in FIG. 13, in the case where the three-phase voltage command Vuc, Vvc, Vwc is calculated and at the time the calculated three phase voltage command Vuc, Vvc, Vwc is reflected in the processing of the inverter control section after the start of the operation cycle, the reflection delay of the voltage command operation value is equal to the period from the start time of the operation cycle to the time when the three-phase voltage command Vuc, Vvc, Vwc is calculated (Kd×ΔTo). This is shorter than the operation period ΔTo. In this case, the processing delay time ΔTds is equal to (Kd+0.5)×ΔTo as the sum of the period from the start time of the operation cycle to the time when the voltage command is calculated and reflected in the drive control of the inverter IN (Kd×ΔTo) and 0.5×ΔTo due to zero-order hold. In this case, the operation period error operation section 35 is configured to calculate the processing delay phase Δθds by multiplying the period that is (Kd+0.5) times the operation period ΔTo and the high frequency ωh. The operation period error operation section 35 may be configured to measure the reflection delay (Kd×ΔTo) of the computed value of the voltage command in real time by a timer and set the reflection delay (Kd×ΔTo) of the computed value of the voltage command on the basis of the measured value.

In the case where the operation period estimation error Δθesds is used to correct the γ-δ axis coordinate system, a coordinate transformation to the γ-δ axis coordinate system is carried out by using the high frequency phase θh minus the phase double the operation period estimation error Δθesds (θhc=θh−2Δθesds), as described regarding the magnetic flux interference estimation error Δθescr. On the other hand, in the case where the operation period estimation error Δθesds is used to correct the high frequency target value θδhd, the high frequency target value θδhd is set as its initial value of zero minus the operation period estimation error Δθesds (θδhc=0−Δθesds).

OTHER EMBODIMENTS

Lastly, other embodiments of the present invention will be described. The configuration of each of the following embodiments may not only be used by itself, but also be combined with any of the configurations of the other embodiments as long as no inconsistency arises.

(1) The above embodiment is described with respect to an example in which the steady estimation error correcting section 33 is configured to calculate both the magnetic flux interference estimation error Δθescr and the operation period estimation error Δθesds, and correct the high frequency phase θh for use in the coordinate transformation to the γδ axis coordinate system or the high frequency target value θδhc, on the basis of the steady estimation error Δθes as the sum of the magnetic flux interference estimation error Δθescr and the operation period estimation error Δθesds. However, embodiments of the present invention are not limited to this. That is, the steady estimation error correcting section 33 may be configured to calculate only one of the magnetic flux interference estimation error Δθescr and the operation period estimation error Δθesds, and correct the high frequency phase θh for use in the coordinate transformation to the γ-δ axis coordinate system or the high frequency target value θδhc, on the basis of the steady estimation error Δθes that is set to the calculated one of the magnetic flux interference estimation error Δθescr and the operation period estimation error Δθesds.

(2) The above embodiment is described with respect to an example in which the basic d-q axis current command Idcb, Iqcb to which the high frequency current command Idch, Iqch is to be added is set by the torque current operation section 40 on the basis of the torque command Tmc. However, embodiments of the present invention are not limited to this. That is, the basic d-q axis current command Idcb, Iqcb may be set by a method other than the method based on the torque command Tmc, such as by a rotational speed control section that makes the estimated magnetic pole rotational speed wee closer to a target rotational speed. In this case, the magnetic flux interference estimation error Δθescr is calculated on the basis of the d-q axis current command Idc, Iqc.

The present invention is applicable to rotating electrical machine control devices that apply a high frequency current to a rotating electrical machine including a rotor having saliency, estimate the magnetic pole direction of the rotor on the basis of a high frequency component contained in a voltage command as a response component to the high frequency current, and control the rotating electrical machine.

The invention claimed is:

1. A rotating electrical machine control device that applies a high frequency current to a rotating electrical machine including a rotor having saliency, estimates a magnetic pole direction of the rotor on the basis of a high frequency component contained in a voltage command as a response component to the high frequency current, and controls the rotating electrical machine, comprising:

a high frequency superimposing section that sets an estimated d-q axis rotating coordinate system in which the estimated magnetic pole direction is defined as an estimated d-axis and a direction perpendicular to the estimated d-axis in terms of an electrical angle is defined as an estimated q-axis, and superimposes a high frequency current command as a command of the high frequency current on a current command to the rotating electrical machine in the estimated d-q axis rotating coordinate system;

a magnetic pole direction adjusting section that sets a high frequency coordinate system having a phase difference of the high frequency current command with respect to the estimated d-q axis rotating coordinate system, and changes an estimated value of the magnetic pole direction so that a value on the high frequency coordinate system resulting from a coordinate transformation of the voltage command represented by the estimated d-q axis rotating coordinate system becomes closer to a high frequency target value whose initial value is set to zero; and a steady estimation error correcting section that calculates, regarding d-q axis magnetic flux interference in which a change in current on one of d and q axes affects a magnetic flux on the other axis, a magnetic flux interference estimation error as an error of the estimated value of the magnetic pole direction which is caused by the d-q axis magnetic flux interference, on the basis of the current command or a torque command to the rotating electrical machine, and corrects, on the basis of the magnetic flux interference estimation error, a phase of the high frequency current command for use in the coordinate transformation or the high frequency target value.

2. The rotating electrical machine control device according to claim 1, wherein the steady estimation error correcting section corrects the phase of the high frequency current command or the high frequency target value also on the basis of an operation period estimation error as an error of the estimated value of the magnetic pole direction which is caused by an operation period of the voltage command in the estimated d-q axis rotating coordinate system, in addition to the magnetic flux interference estimation error.

3. The rotating electrical machine control device according to claim 2, wherein the steady estimation error correcting section uses as the operation period estimation error an error of the estimated value of the magnetic pole direction which is caused according to a phase as a product of a period that is 1.5 times the operation period of the voltage command and an angular frequency of the high frequency current command.

* * * * *